US008249424B2

(12) United States Patent
Shimizu et al.

(10) Patent No.: US 8,249,424 B2
(45) Date of Patent: *Aug. 21, 2012

(54) INFORMATION RECORDING MEDIUM IN WHICH GROOVE TRACKS ARE WOBBLED BY FREQUENCY 2N TIMES WOBBLE FREQUENCY OF STANDARD

(75) Inventors: Akira Shimizu, Saitama (JP); Masayoshi Yoshida, Saitama (JP); Tsuyoshi Hasebe, Saitama (JP); Masahiro Kato, Saitama (JP); Eisaku Kawano, Saitama (JP); Shoji Taniguchi, Saitama (JP); Eiji Muramatsu, Saitama (JP)

(73) Assignee: Pioneer Corporation, Tokyo (JP)

( * ) Notice: Subject to any disclaimer, the term of this patent is extended or adjusted under 35 U.S.C. 154(b) by 413 days.

This patent is subject to a terminal disclaimer.

(21) Appl. No.: 12/235,259

(22) Filed: Sep. 22, 2008

(65) Prior Publication Data
US 2009/0087171 A1 Apr. 2, 2009

Related U.S. Application Data

(62) Division of application No. 12/293,946, filed as application No. PCT/JP2007/056050 on Mar. 23, 2007.

(30) Foreign Application Priority Data

Mar. 24, 2006 (JP) ................................. 2006-083513

(51) Int. Cl.
H04N 9/80 (2006.01)
H04N 5/92 (2006.01)
H04N 5/93 (2006.01)
(52) U.S. Cl. ......... 386/252; 386/248; 386/326; 386/353

(58) Field of Classification Search ............... 386/94, 386/126, 252–260, 326–342, 353–357; 369/44.13, 369/275.2, 275.3, 275.4, 278; 380/201, 203, 380/204, 210, 220
See application file for complete search history.

(56) References Cited

U.S. PATENT DOCUMENTS

| 6,678,236 | B1 * | 1/2004 | Ueki ........................ 369/275.3 |
| 6,894,964 | B2 * | 5/2005 | Park et al. ................. 369/53.34 |
| 7,508,894 | B2 * | 3/2009 | Hsiao ........................... 375/371 |
| 7,626,907 | B2 * | 12/2009 | Chang et al. ............... 369/53.22 |

FOREIGN PATENT DOCUMENTS

| EP | 1 102 249 | 7/1999 |
| EP | 0 962 930 | 12/1999 |

(Continued)

OTHER PUBLICATIONS

"Content Protection on DVD", Toshiba Review, vol. 58, No. 6, 2003, pp. 28-31 with English comments.

(Continued)

*Primary Examiner* — Thai Tran
*Assistant Examiner* — Hung Dang
(74) *Attorney, Agent, or Firm* — Young & Thompson

(57) ABSTRACT

An optical disc (100) is provided with a recording region where prescribed clock information (WBL) is preformatted for recording. The clock information is (i) included in a first frequency band that is definable by a first reference frequency (Fstd) (that is impossible for a conventional reproducing device to detect by a detecting method based on a self-correlation) and is (ii) defined by a frequency that is integer times the first frequency.

2 Claims, 17 Drawing Sheets

FOREIGN PATENT DOCUMENTS

WO 2005/050907 6/2005

OTHER PUBLICATIONS

"Issuance of "DVD Download Disc for CSS Managed Recording" Specification" Mar. 2007, XP002535714.

European Patent Office issued an European Search Report dated Jul. 20, 2009, Application No. 07729491.4.

European Patent Office issued an European Search Report dated Jun. 10, 2010, Application No. 08165514.4.

* cited by examiner

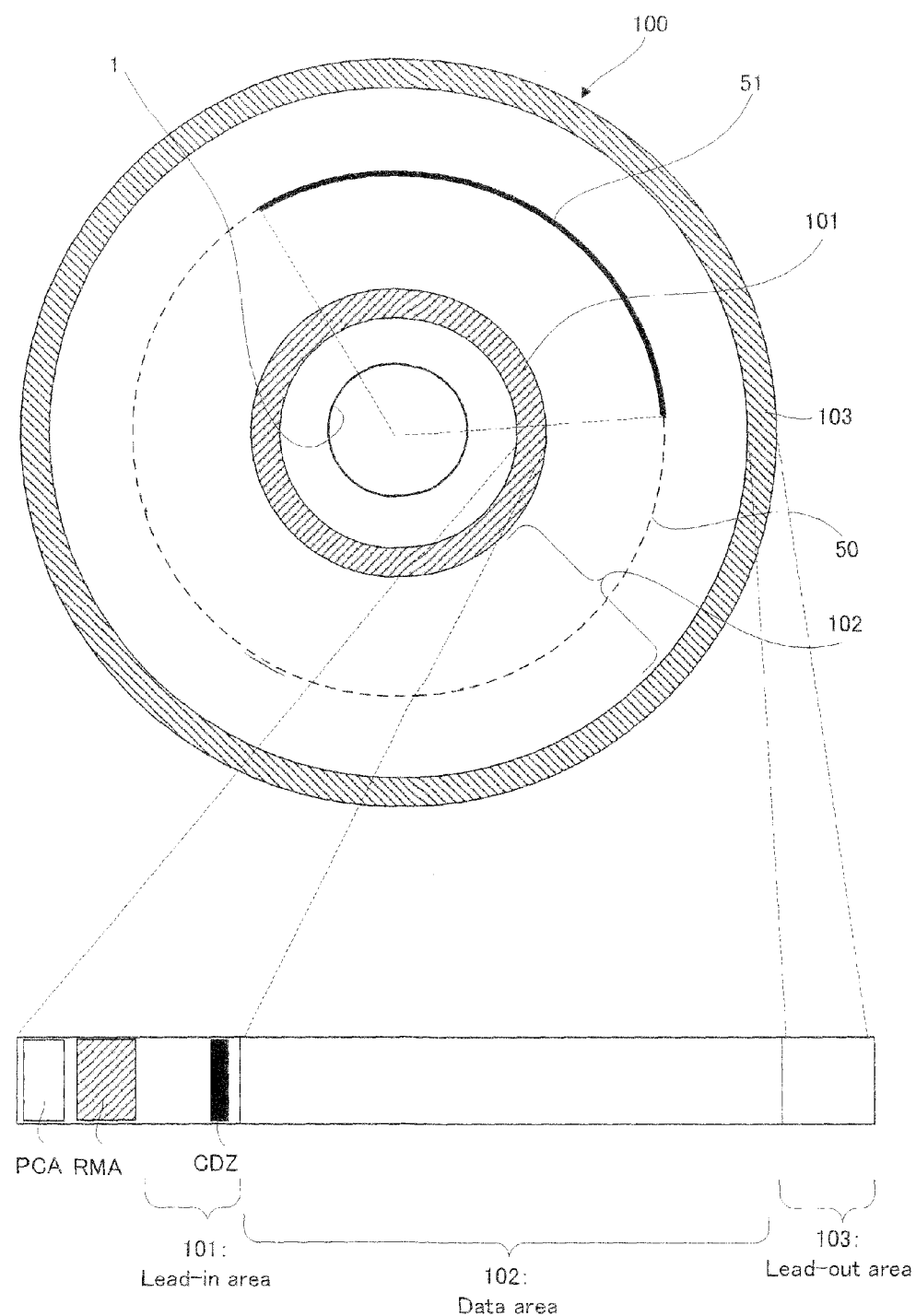

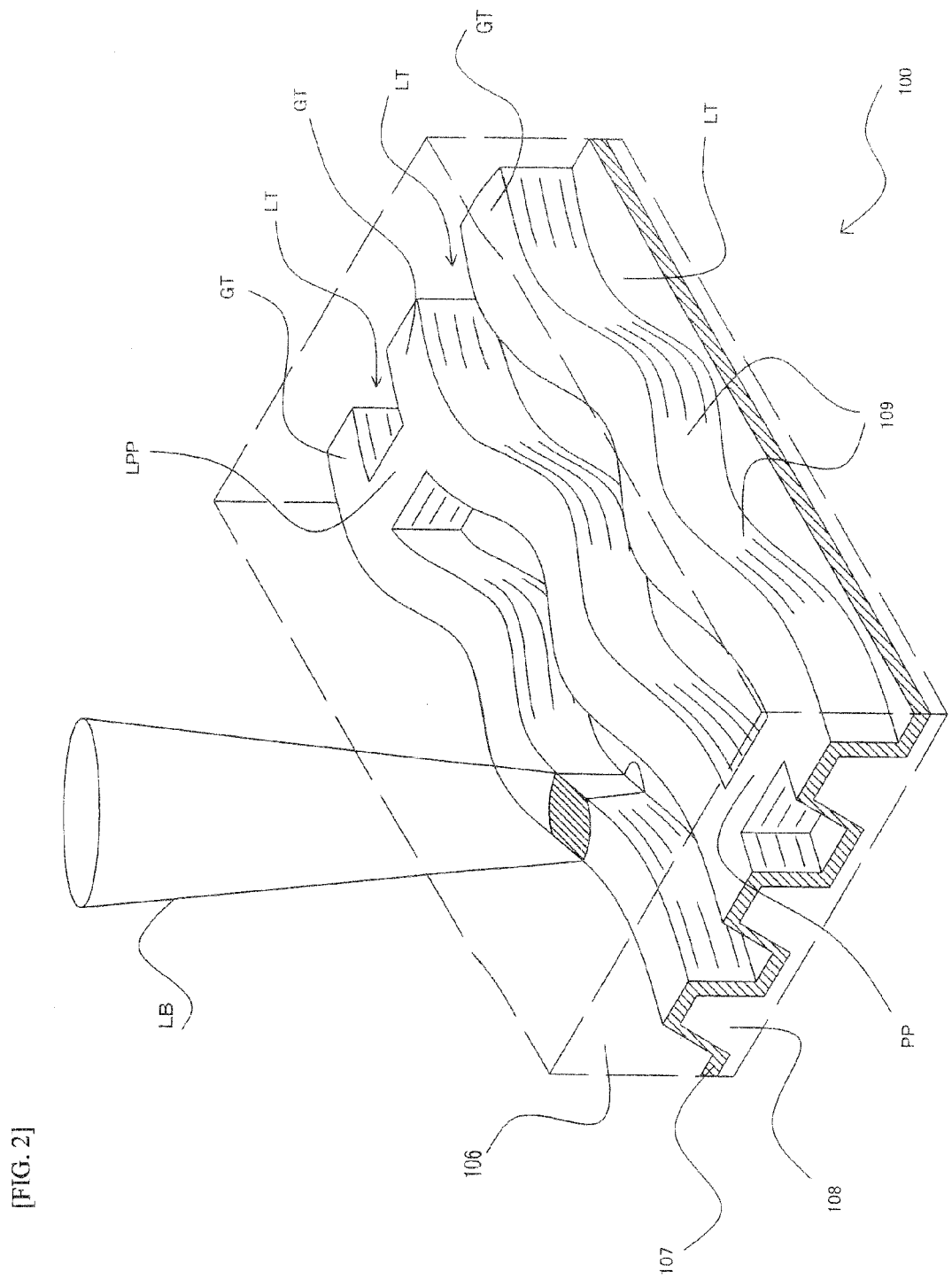
[FIG. 2]

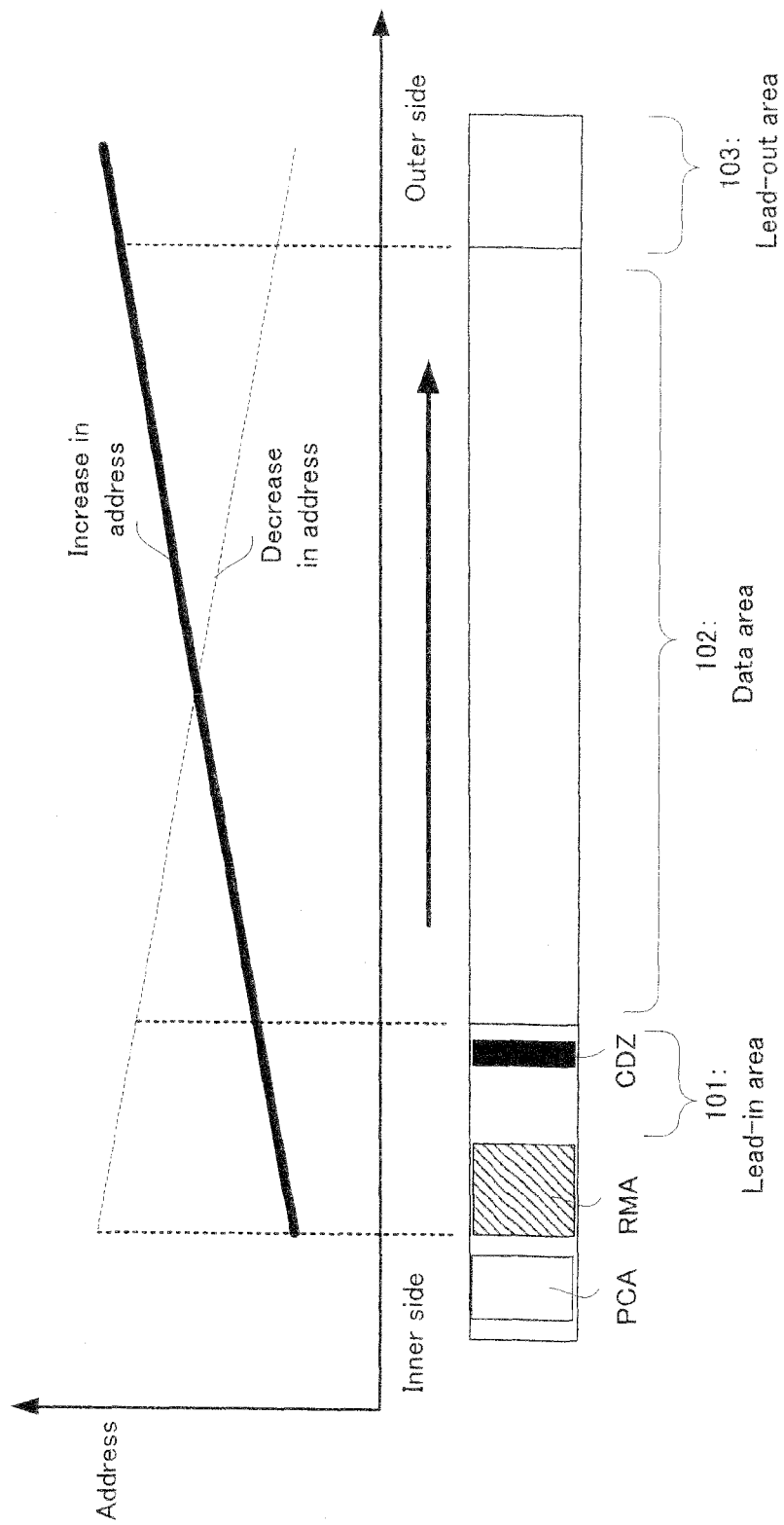
[FIG. 3]

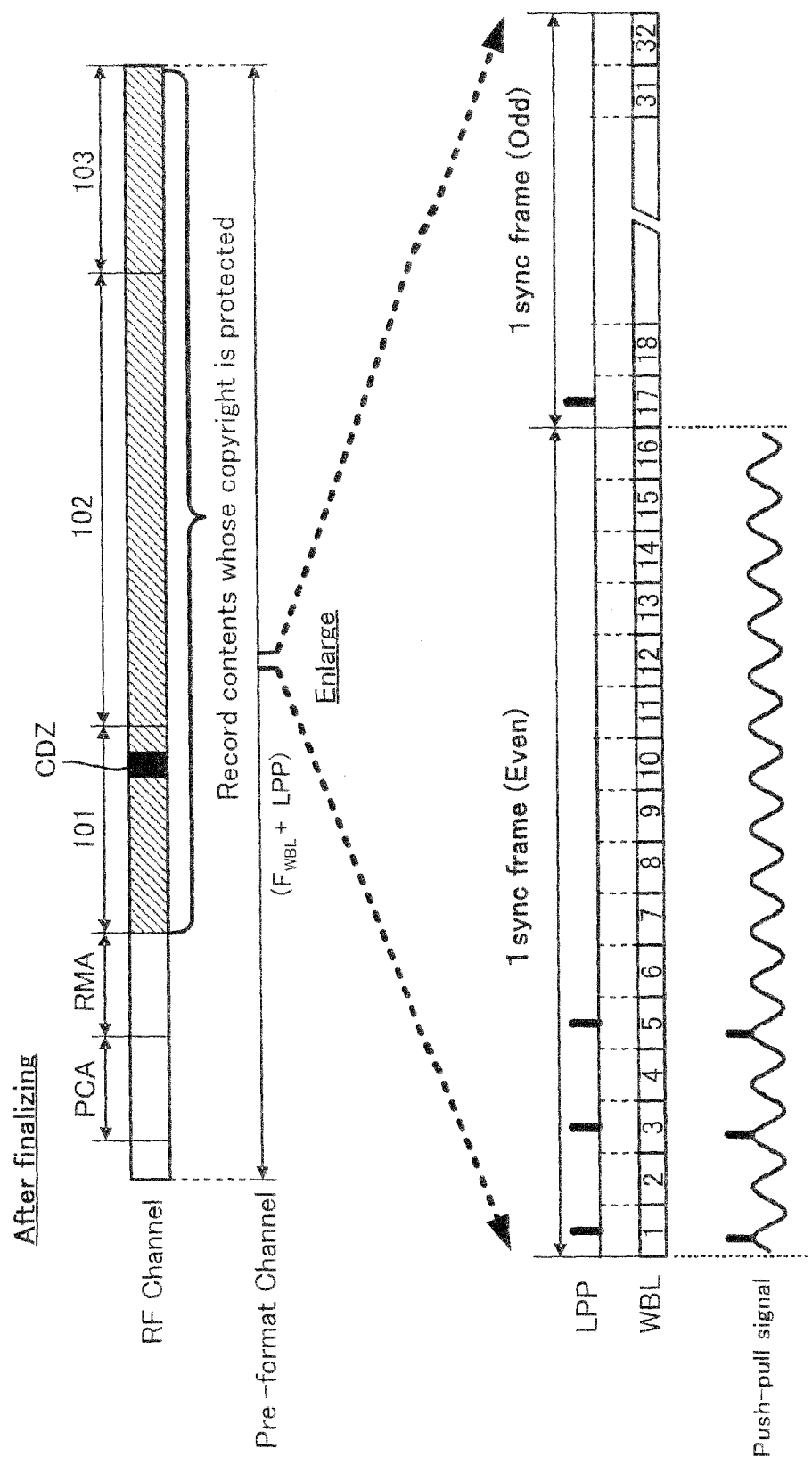
[FIG. 4]

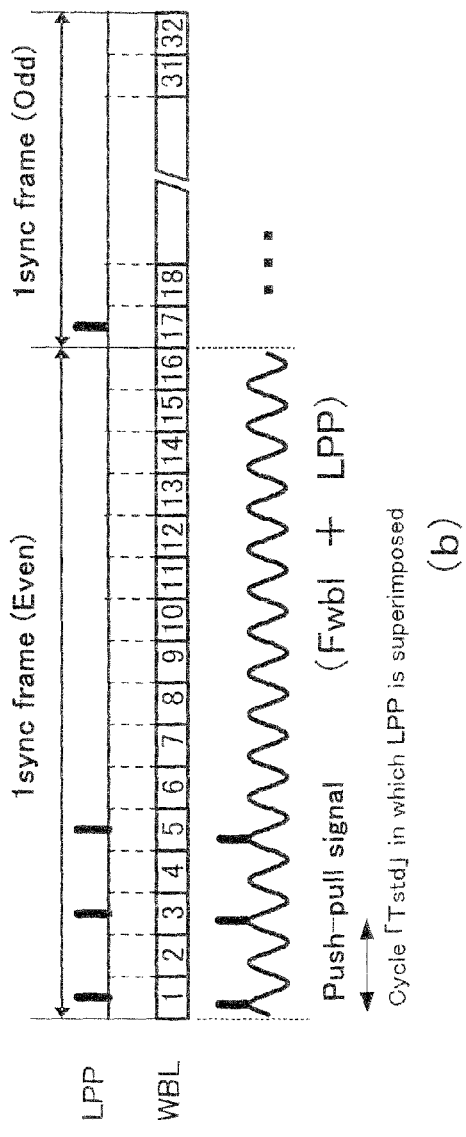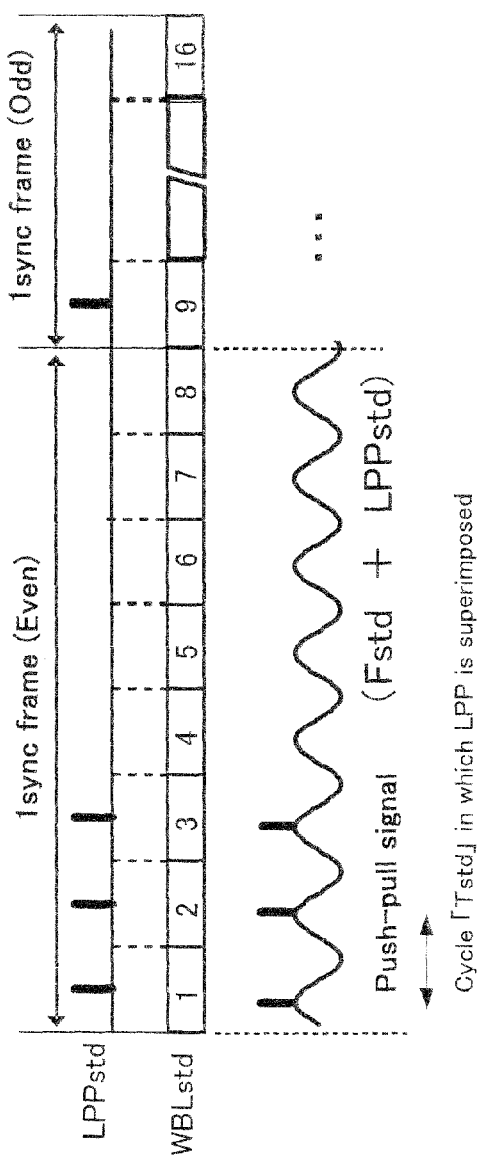
[FIG. 5]

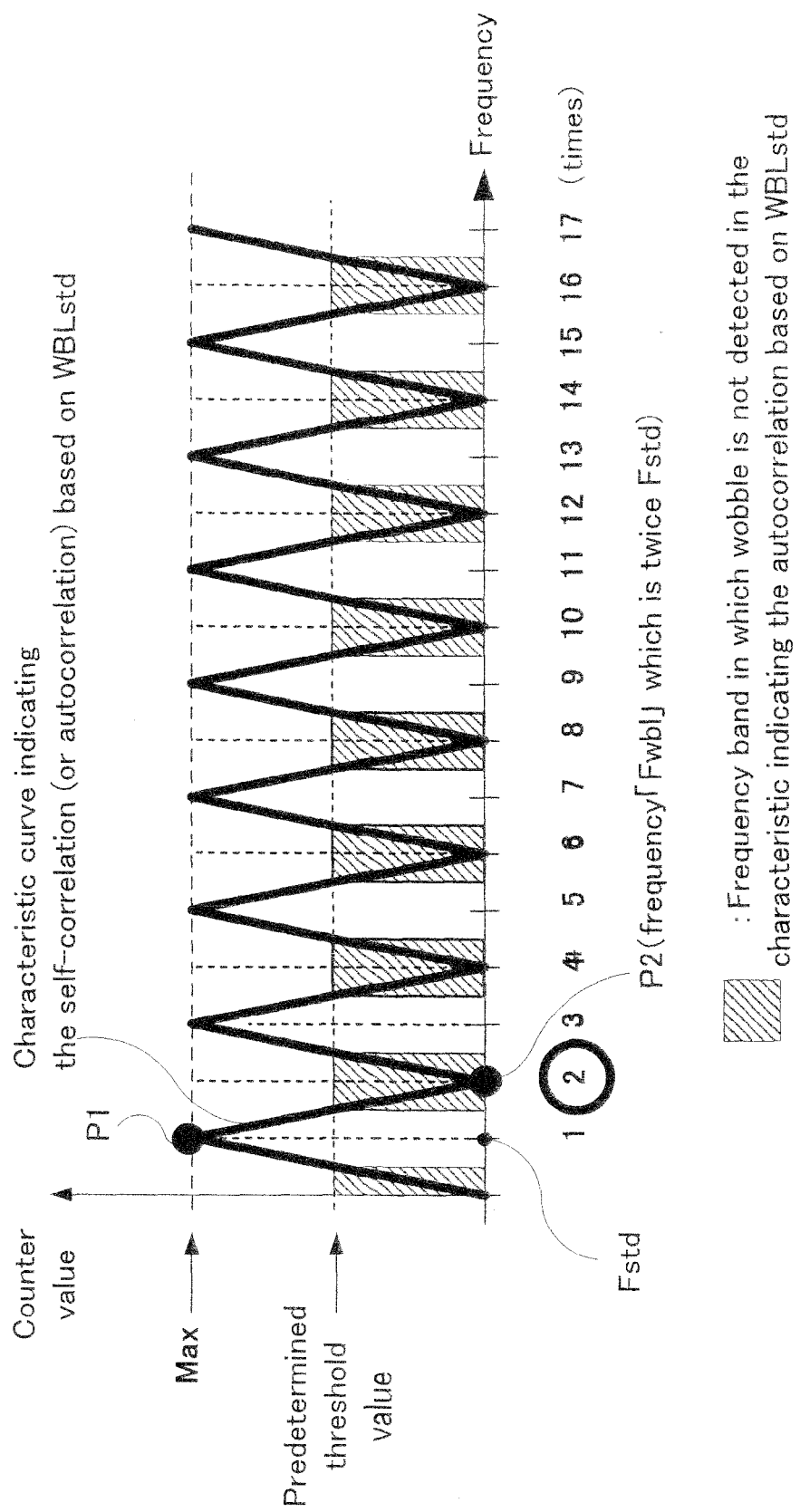
[FIG. 6]

[FIG. 7]
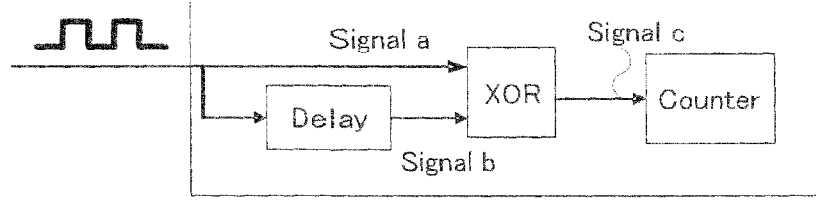

[FIG. 8]
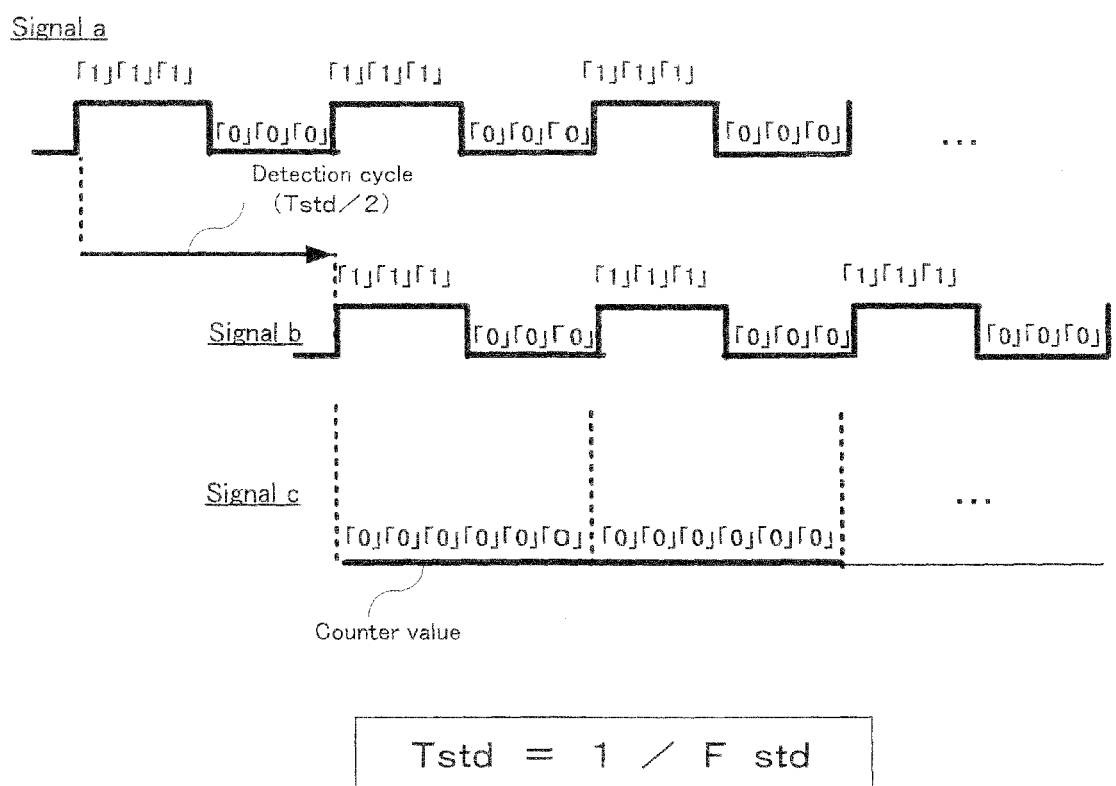

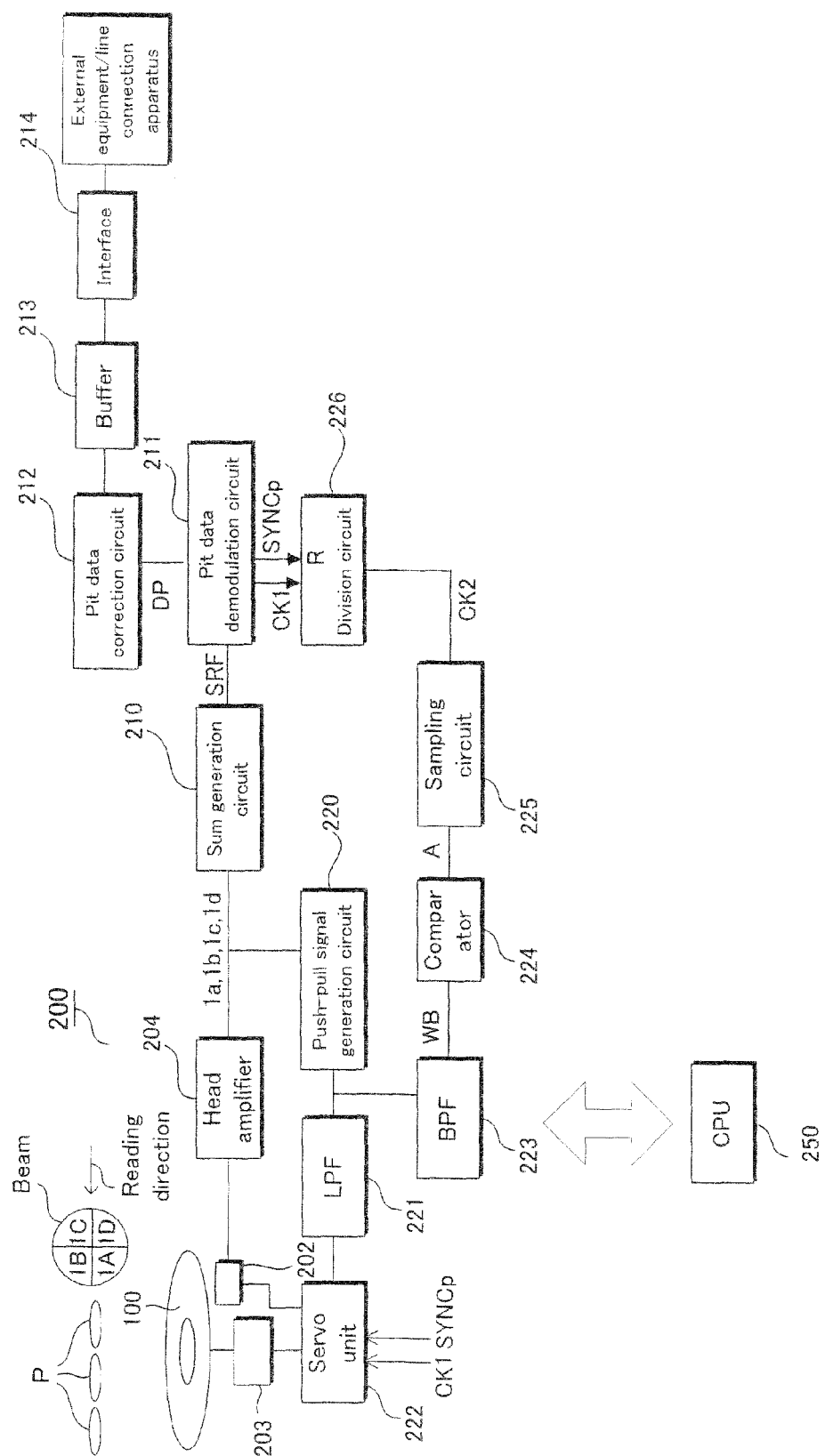
[FIG. 9]

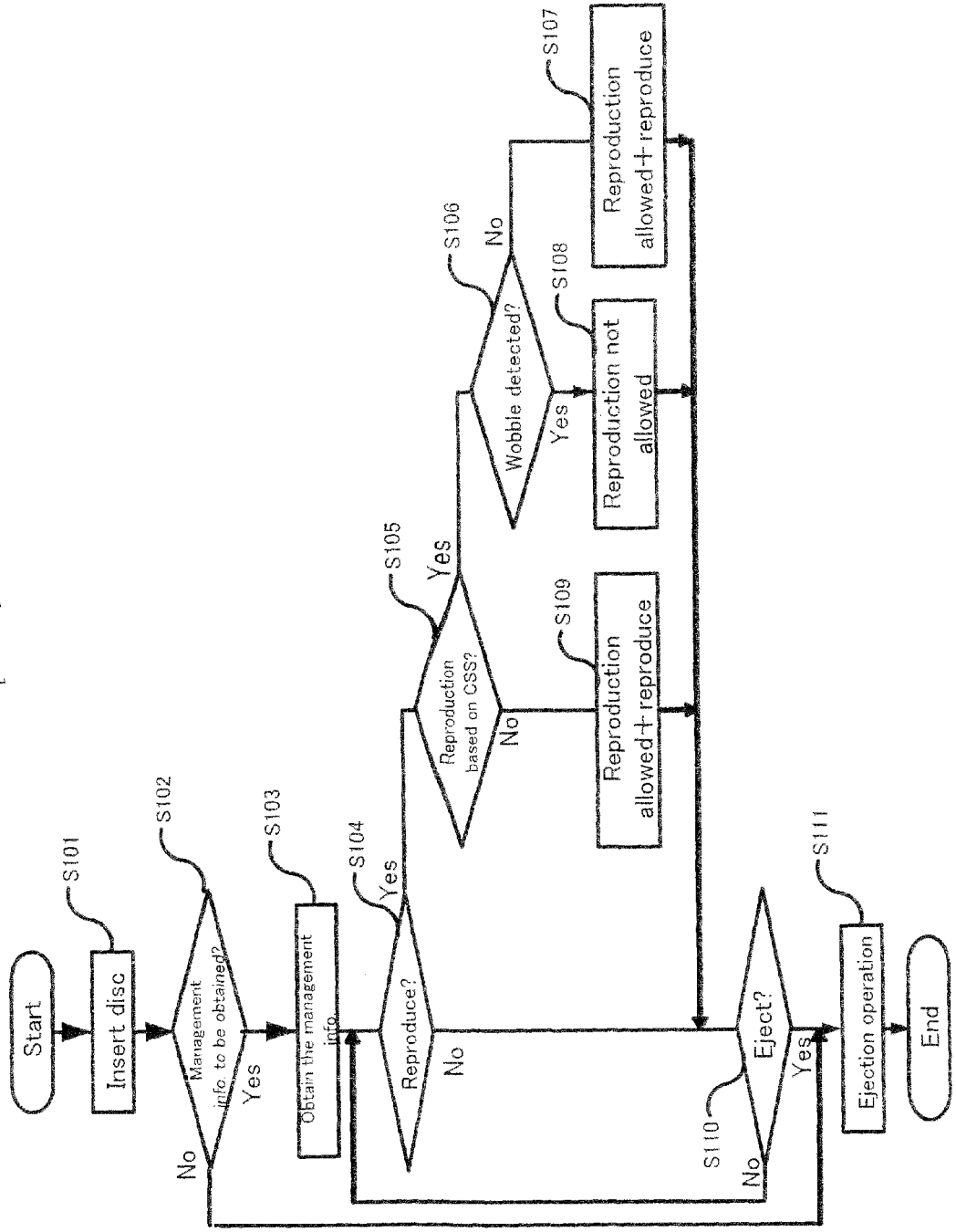
[FIG. 10]

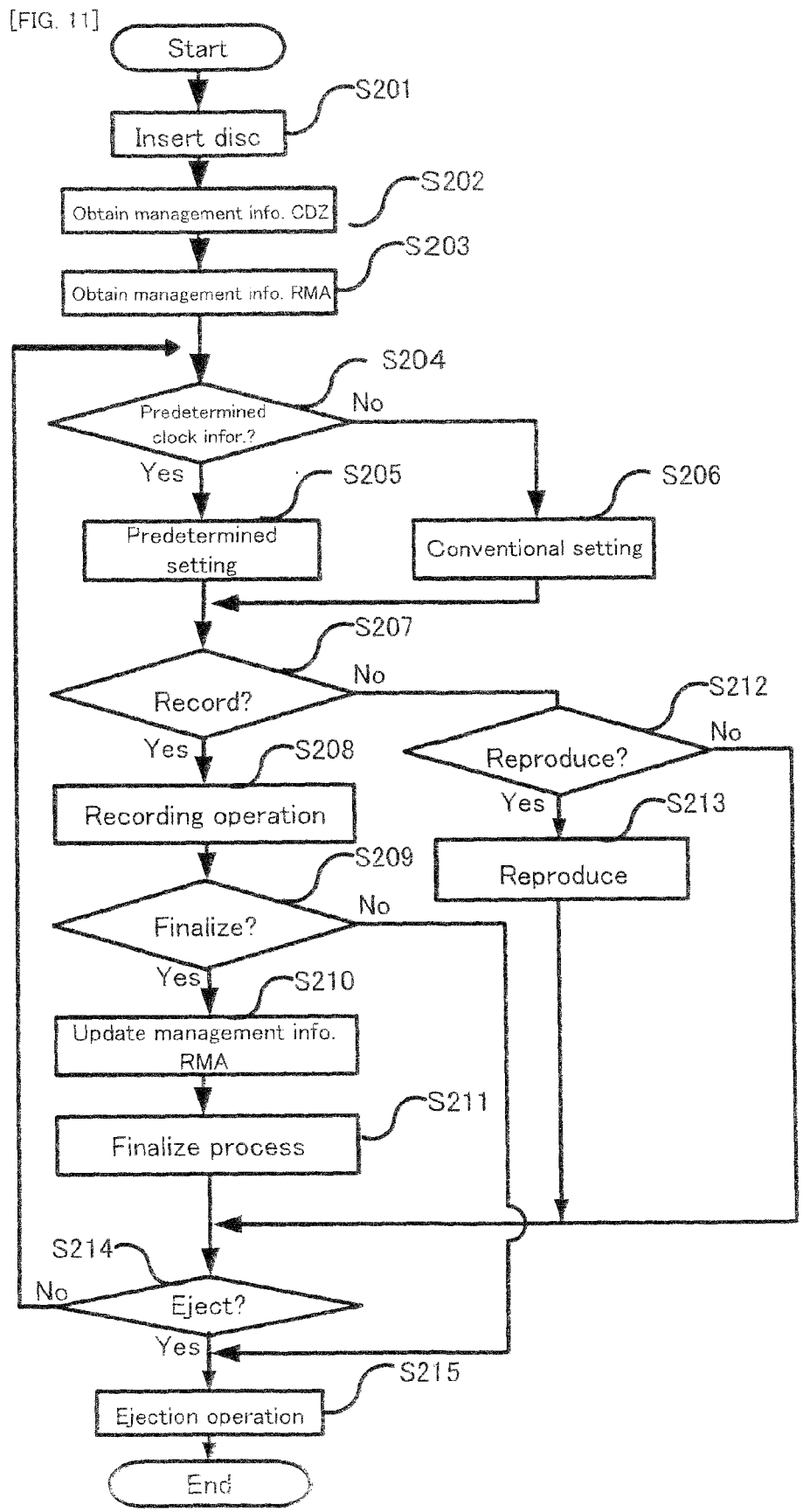

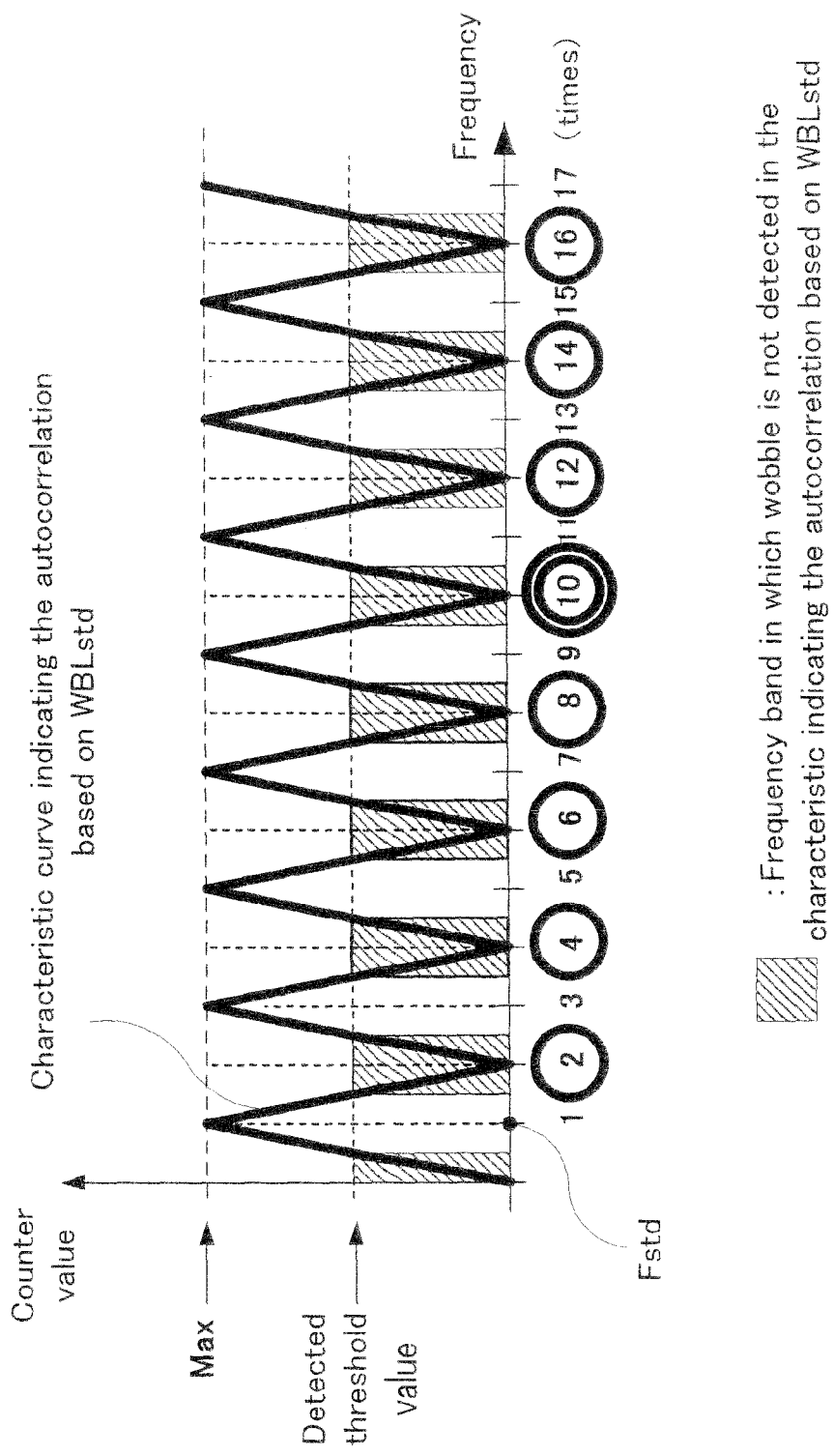

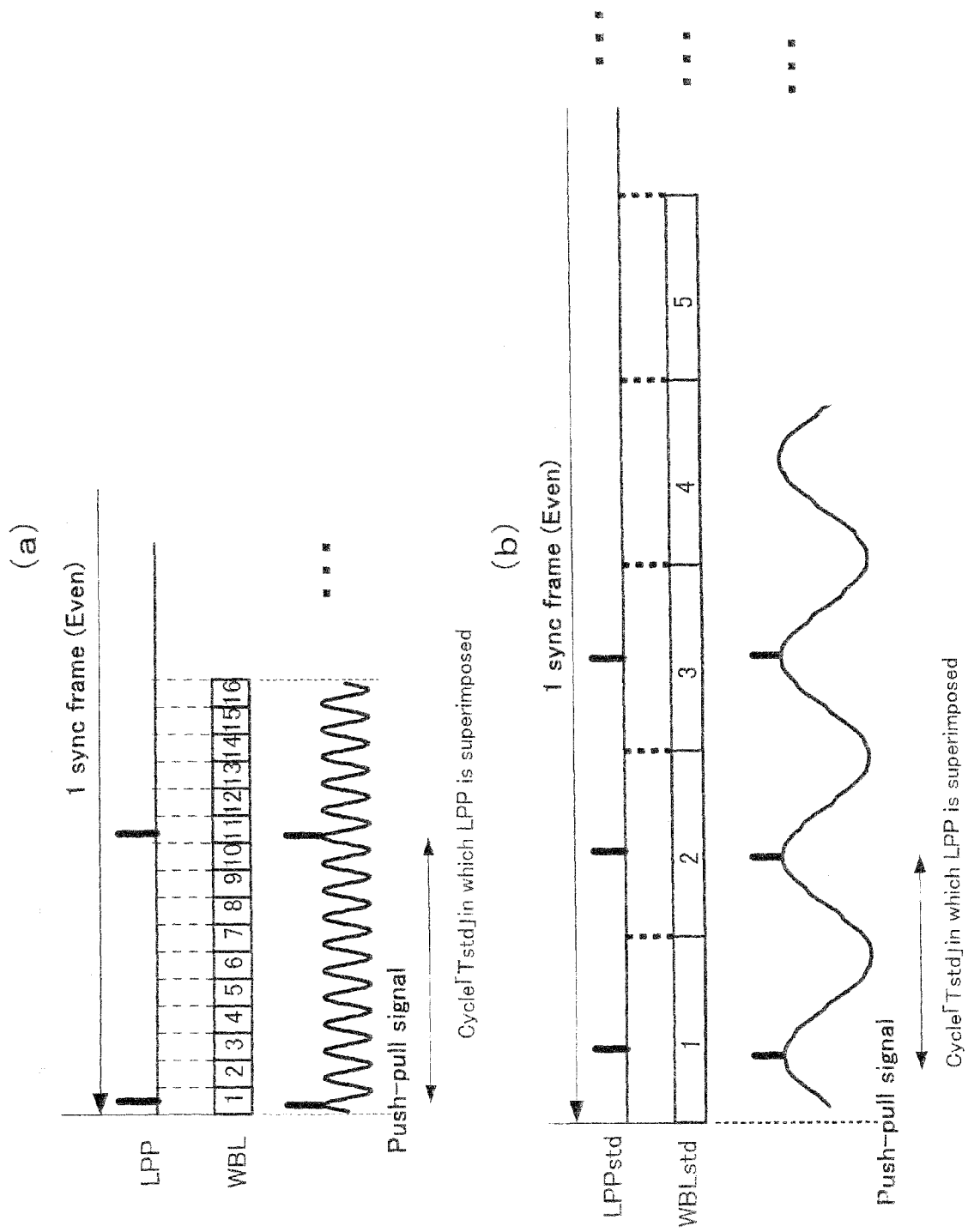

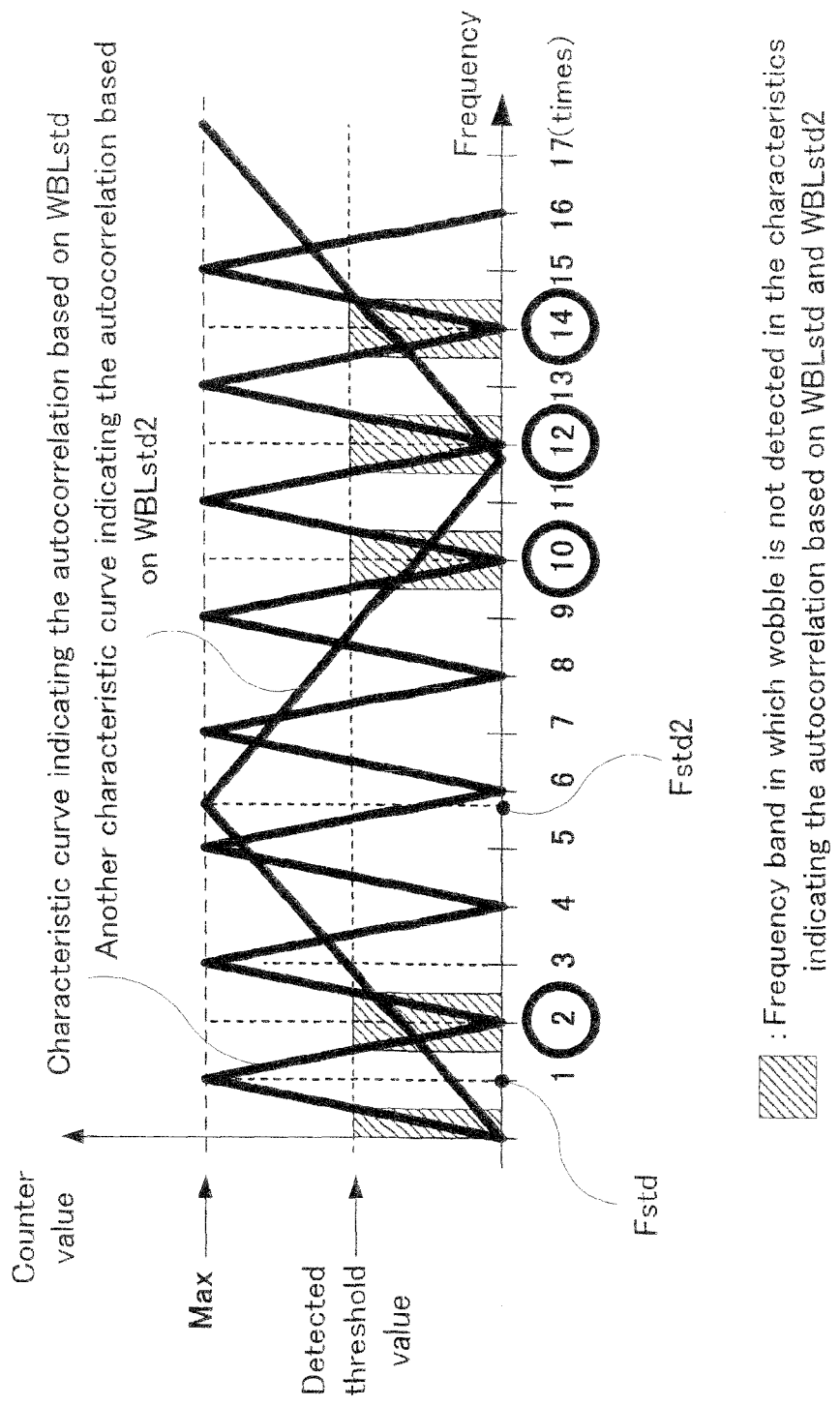

[FIG. 15]
(a)
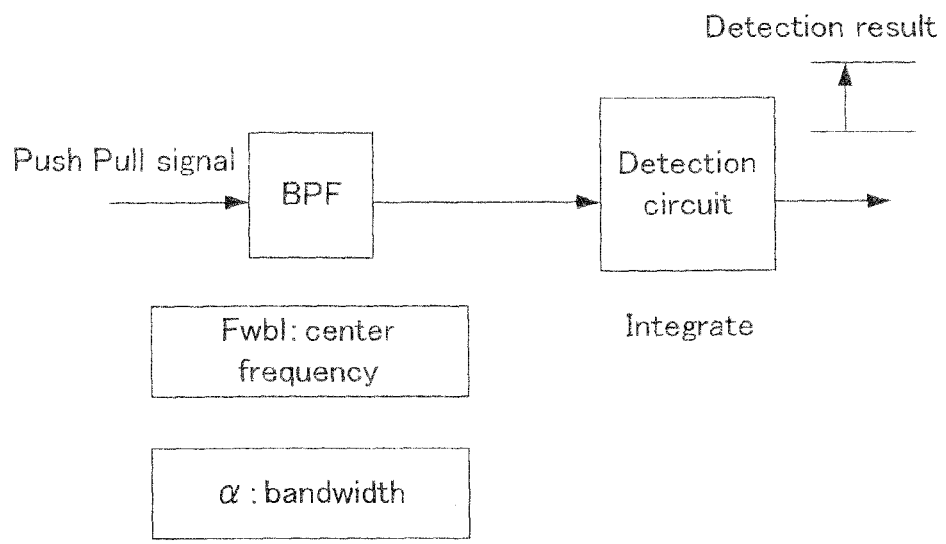
(b)
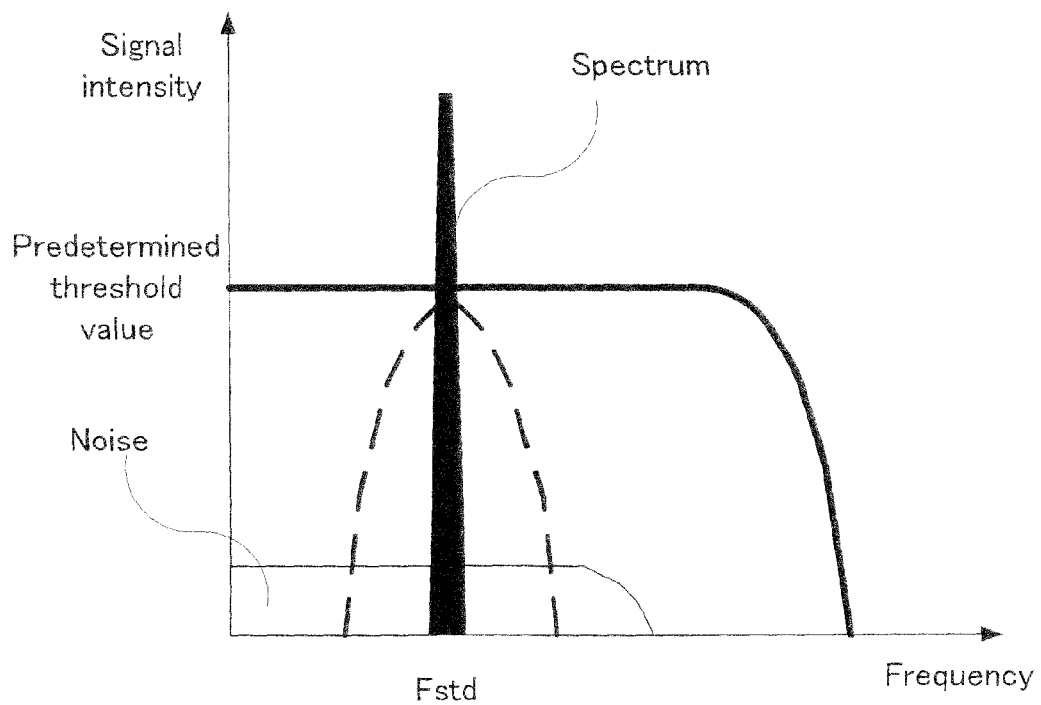

[FIG. 16]
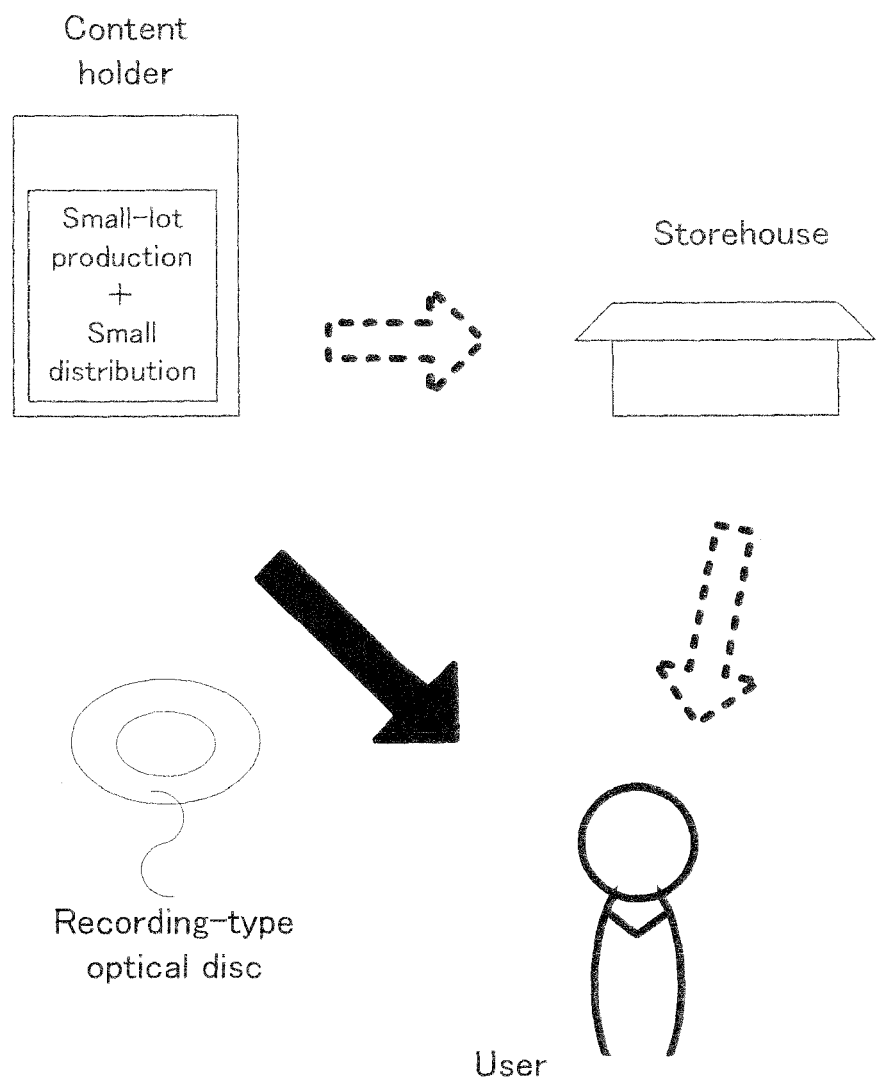

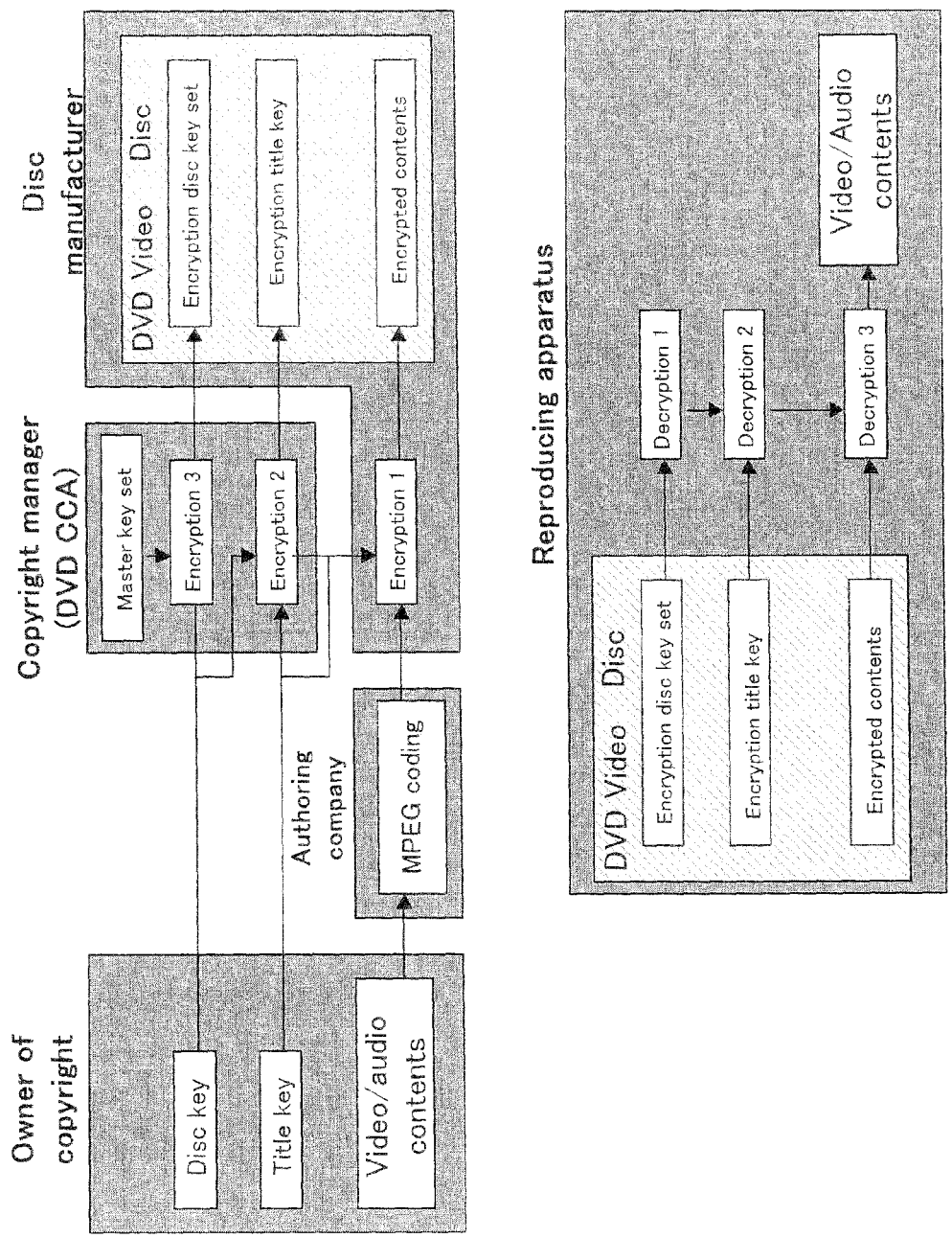
[FIG. 17]

INFORMATION RECORDING MEDIUM IN WHICH GROOVE TRACKS ARE WOBBLED BY FREQUENCY 2N TIMES WOBBLE FREQUENCY OF STANDARD

TECHNICAL FIELD

The present invention relates to an information recording medium, such as an optical disc, on which recording and reproduction can be performed by irradiating it with laser light, such as a DVD (Digital Versatile Disc), a BD (Blu-ray Disc), and a CD (Compact Disc), a recording apparatus and method and a reproducing apparatus and method for the information recording medium, and a computer program.

BACKGROUND ART

The conventional recording-type information recording medium (recording-type media) is designed as follows. That is, in the recording-type information recording medium, firstly, contents such as movie contents which allow free copy that does not need copyright protection, so-called copy-free contents are recorded on the basis of e.g. a DVD-Video format, and a finalize process can be performed. In addition, on the recording-type information recording medium on which the finalize process has been performed, reproduction can be performed while retaining reproduction compatibility by a conventional reproducing apparatus, such as a DVD player.

On the other hand, in the DVD-Video format, the copyright protection is realized by an encryption system, such as a CSS (Content Scramble System). Specifically, if the contents whose copyright is protected by the CSS are recorded onto the recording-type information recording medium, the reproduction of the contents is not allowed by a reproduction restriction system for protecting the copyright of the contents held by the reproducing apparatus, and the reproduction of the contents is prohibited without exception. In other words, in general, the conventional reproducing apparatus recognizes that the contents whose copyright is protected by the CSS are basically recorded in advance only on a read-only information recording medium, such as a DVD-ROM. Thus, the conventional reproducing apparatus judges that the contents are illegally copied in violation of the DVD-Video format if the contents whose copyright is protected by the CSS are recorded on the recording-type information recording medium. Then, the reproduction of the contents is not allowed by the reproduction restriction system, and the reproduction of the contents is prohibited without exception. In addition, the judgment of whether or not to be the recording-type information recording medium is based on whether or not a signal is detected from wobble (hereinafter referred to as a "wobble signal" as occasion demands) unique to the recording-type information recording medium.

More specifically, as shown in FIG. 17, under the encryption system, such as a CSS, the contents are encrypted and decrypted in the following procedure. The contents, such as video and audio, are firstly MPEG-coded by an authoring company. Then, the MPEG-coded contents are encrypted by a title key (i.e. encryption 1) by a disc manufacturer, and are recorded onto the information recording medium, such as a DVD Video disc, as encrypted contents (refer to a right-shaded portion in FIG. 17). Then, the title key is encrypted by a disc key (i.e. encryption 2) by a copyright manager (e.g. DVD CCA) and is recorded onto the information recording medium as an encryption title key. In substantially the same manner, the disc key is also encrypted by a master key set (encryption 3) by the copyright manager and is recorded onto the information recording medium as an encryption disc key set.

On the other hand, a general information recording/reproducing apparatus, such as the reproducing apparatus, generates the disc key by decrypting the encryption disc key set (i.e. decryption 1), which is recorded on the information recording medium, such as a DVD Video disc. The generated disc key allows the encryption title key to be decrypted (i.e. decryption 2) and the title key to be generated. Lastly, the generated title key allows the encrypted contents to be decrypted (i.e. decryption 3), the contents, such as video and audio, to be generated, and the contents to be reproduced.

Patent document 1: Japanese Patent Application Laid Open NO. 2004-55079

Patent document 2: Japanese Patent Application Laid Open NO. 2001-307427

Patent document 3: Japanese Patent Application Laid Open NO. 2001-357001

Patent document 4: Japanese Patent Application Laid Open NO. 2000-311346

Non-patent document 1: "Protection of Contents on DVD", Toshiba Review, Vol. 58, No 6 (2003).

DISCLOSURE OF INVENTION

Subject to be Solved by the Invention

However, under the encryption system about the copyright protection, such as a CSS, described above, if a content supplier (content holder) that owns the copyright uses the recording-type information recording medium and tries to supply a general user with the contents whose copyright is protected through a legal procedure about the copyright protection, the following technical problem will occur. That is, there is such a technical problem that regardless of the contents recorded on the recording-type information recording medium through the legal procedure about the copyright protection, a general user is not allowed to reproduce the contents by the reproduction restriction system held by the conventional reproducing apparatus (or general information recording/reproducing apparatus), and the reproduction of the contents is prohibited without exception.

In view of the aforementioned problems, it is therefore an object of the present invention to provide an information recording medium, an information recording apparatus and method, and an information reproducing apparatus and method, which can realize both the copyright protection of record data, such as contents, and the retention of reproduction compatibility on a recording-type information recording medium, and a computer program which makes a computer function as the information recording apparatus and the information reproducing apparatus.

Means for Solving the Subject

Information Recording Medium

Hereinafter, the information recording medium of the present invention will be explained.

The above object of the present invention can be achieved by a n information recording medium provided with a recording area in which predetermined clock information (wobble or WBL) is pre-formatted, for reproduction of record data, (i) the predetermined clock information being included in a first frequency band defined by a first reference frequency (Fstd: DVD-R/RW) (which cannot be detected in a detection method based on an self-correlation (or autocorrelation) by a conventional reproducing apparatus), (ii) the predetermined clock information being defined by a frequency that is an integral multiple of the first reference frequency.

According to the information recording medium of the present invention, in the recording area provided for the information recording medium, (i) the predetermined clock information included in the first frequency band which can be defined by the first reference frequency (Fstd: DVD-R/RW) is pre-formatted. Here, the "first reference frequency" of the present invention is a frequency which is a reference, such as a frequency of clock information (wobble) pre-formatted on the conventional recording-type optical disc, such as a DVD-R and a DVD-RW. Moreover, the "first frequency band" of the present invention means a frequency band that is not detected as the first reference frequency by the conventional reproducing apparatus for judging whether or not the frequency of the clock information can be detected (or identified) as the first reference frequency (Fstd) on the basis of the self-correlation (or autocorrelation) described later. In particular, the first frequency band may be one continuous frequency band, or may be a plurality of discrete frequency bands.

As a result, for example, a reproduction setting area is included in the recording area, wherein the reproduction setting area is firstly accessed in reproducing the record data and it is to identify whether or not to be the recording media in order to judge whether or not to allow the reproduction of the record data. Therefore, since the predetermined clock information that cannot be detected by the conventional reproducing apparatus (or general information recording/reproducing apparatus) is pre-formatted in the recording area including the reproduction setting area, the general information recording/reproducing apparatus cannot distinguish between the information recording medium of the present invention and a general read-only information recording medium, such as a DVD-ROM, in a reproduction process in the recording area. As a result, the conventional reproducing apparatus can perform the reproduction process on the information recording medium of the present invention, as in the general read-only information recording medium.

Moreover, in the recording area provided for the information recording medium, (ii) the predetermined clock information (wobble) defined by the frequency that is an integral multiple of the first reference frequency (Fstd: DVD-R/RW) is pre-formatted.

As a result, the frequency of the predetermined clock information (wobble) is an integral multiple of the first reference frequency (Fstd: DVD-R/RW). Thus, it is possible to pre-format address information (hereinafter referred to as "predetermined address information" as occasion demands), which cannot be detected by the conventional reproducing apparatus that can detect the address information (hereinafter referred to as "first address information" as occasion demands), such as LPP (Land Pre-Pit), pre-formatted with the first reference frequency and which can hold a simple and proper phase relationship with the predetermined clock information.

If the predetermined clock information is not an integral multiple of the first reference frequency, the specification of the phase relationship between the predetermined clock information and the predetermined address information will get complex in a process of detecting a push-pull signal in the reproduction by the conventional reproducing apparatus, and the process of detecting the predetermined address information will possibly become technically difficult.

In contrast, the frequency of the predetermined clock information (wobble) in the present invention is an integral multiple of the first reference frequency (Fstd: DVD-R/RW). Thus, it is possible to pre-format the predetermined address information by pre-formatting the predetermined address information near a position corresponding to the peak of the wobble (i.e. a position at which the wobble has the maximum amplitude) pre-formatted on the conventional recording-type optical disc, such as the wobble of a DVD-R and a DVD-RW. As a result, it is possible to pre-format the predetermined address information which can hold a simple and proper phase relationship with the predetermined clock information.

In addition, the frequency of the predetermined clock information in the present invention is an integral multiple of the first reference frequency. Thus, even by the conventional reproducing apparatus that performs reproduction on the conventional recording-type optical disc, such as the wobble of a DVD-R, on which the first address information can be detected, signal processing may be performed on the predetermined address information, substantially as in the frame structure and signal structure of the first address information. Therefore, it is possible to almost or completely eliminate a need to change the structure and the process procedure in the signal processing system (or signal processing circuit) of the address information on the conventional reproducing apparatus.

Moreover, in addition, in the recording area provided for the information recording medium, the predetermined clock information and the predetermined address information described above are pre-formatted at all positions. Therefore, in recording the record data, it is possible to record the record data at any position on the basis of one type of signal processing, for example, so that additional recording or rewriting may be performed highly accurately, as compared to the recording based on a plurality types of signal processing.

Consequently, it is possible to supply the contents whose copyright is protected by the encryption system, such as a CSS, to a general user using the recording-type information recording medium on which the predetermined clock information described above is pre-formatted, and it is possible to enable the conventional reproducing apparatus to perform the reproduction process on the supplied contents, appropriately and easily. Therefore, according to the information recording medium of the present invention, it is possible to realize both the copyright protection of the contents and the retention of reproduction compatibility.

In one aspect of the information recording medium of the present invention, the predetermined clock information is defined by a first frequency ($2n \times Fstd$) which is 2n times (wherein "n" is an integer number) the first reference frequency.

According to this aspect, the predetermined clock information (wobble) is defined by the first frequency ($2n \times Fstd$) which is 2n times (wherein "n" is an integer number) the first reference frequency. Therefore, the conventional reproducing apparatus for judging whether or not the frequency of the clock information can be detected (or identified) as the first reference frequency on the basis of the self-correlation hardly detects or does not detect the predetermined clock information at all. Here, the "self-correlation" of the present invention is a correlation between one variable indicating a signal feature and another variable indicating the signal feature, defined to make the signal feature, such as a frequency, amplitude, and phase, inductively quantitative or qualitative, in various signal, such as a wobble signal.

As a result, the conventional reproducing apparatus can perform the reproduction process on the information recording medium of the present invention, as in the general read-only information recording medium. Therefore, it is possible to realize the retention of reproduction compatibility, more accurately.

In an aspect associated with the predetermined clock information, the predetermined clock information may be defined by a predetermined range of frequency centered on the first frequency ($2n \times Fstd \pm \alpha$).

By virtue of such construction, it is possible to realize the retention of reproduction compatibility, more accurately, on the basis of the predetermined range of frequency centered on the first frequency ($2n \times Fstd \pm \alpha$).

In another aspect of the information recording medium of the present invention, the frequency of the predetermined clock information is further included in a second frequency band (Fwb2: DVD+R/RW) defined by a second reference frequency, which is different from the first reference frequency (which cannot be detected in the detection method based on the self-correlation by the conventional reproducing apparatus).

According to this aspect, in the recording area provided for the information recording medium of the present invention, (i) the predetermined clock information (wobble) also included in the second frequency band which can be defined by the second reference frequency (Fwb2: DVD+R/RW) is pre-formatted. Here, the "second reference frequency" of the present invention is a frequency which is a reference, such as a frequency of clock information (wobble) pre-formatted on the conventional recording-type optical disc, such as a DVD+R and a DVD+RW. Moreover, the "second frequency band" of the present invention means a frequency band that is not detected as the second reference frequency by the conventional reproducing apparatus for judging whether or not the frequency of the clock information can be detected (or identified) as the second reference frequency.

As a result, for example, the reproduction setting area is included in the recording area, wherein the reproduction setting area is firstly accessed in reproducing the record data and it is to identify whether or not to be the recording media in order to judge whether or not to allow the reproduction of the record data. Therefore, since the predetermined clock information that cannot be detected by the general information recording/reproducing apparatus (hereinafter referred to as a "second information recording/reproducing apparatus" as occasion demands) for performing the recording or reproduction process on the basis of the second reference frequency is pre-formatted in the reproduction setting area, the second information recording/reproducing apparatus cannot distinguish between the information recording medium of the present invention and a general read-only information recording medium, such as a DVD-ROM, in a reproduction process in the recording area. As a result, the second information recording/reproducing apparatus can perform the reproduction process on the information recording medium of the present invention, as in the general read-only information recording medium.

Moreover, in the recording area provided for the information recording medium, the predetermined clock information may not be pre-formatted by the frequency which is an integral multiple of the second reference frequency (Fwb2: DVD+R/RW). In this case, the predetermined clock information is preferably pre-formatted at least by the frequency which is an integral multiple of the first reference frequency described above, from the viewpoint of the simple detection of the predetermined address information.

Alternatively, in the recording area provided for the information recording medium, the predetermined clock information may be pre-formatted by the frequency which is an integral multiple of the second reference frequency.

As a result, the frequency of the predetermined clock information is an integral multiple of the second reference frequency. Thus, for example, it is possible to pre-format the predetermined address information, which cannot be detected by the conventional reproducing apparatus that can detect the address information (hereinafter referred to as "second address information" as occasion demands), such as LPP, pre-formatted with the second reference frequency and which can hold a simple and proper phase relationship with the predetermined clock information.

In an aspect associated with the predetermined clock information, the predetermined clock information may be defined by a second frequency ($2m \times Fwb2$) which is 2m times (wherein "m" is an integer number) the second reference frequency.

By virtue of such construction, the predetermined clock information (wobble) is defined by the second frequency ($2m \times Fwb2$) which is 2m times (wherein m is a natural number) the second reference frequency. Therefore, the second information recording/reproducing apparatus for judging whether or not the frequency of the clock information can be detected (or identified) as the second reference frequency on the basis of the self-correlation hardly detects or does not detect the predetermined clock information at all.

As a result, the second information recording/reproducing apparatus can perform the reproduction process on the information recording medium of the p resent invention, as in the general read-only information recording medium. Therefore, it is possible to realize the retention of reproduction compatibility, more accurately.

Moreover, in this aspect associated with the predetermined clock information, the predetermined clock information may be defined by a predetermined range of frequency centered on the second frequency ($2m \times Fwb2 \pm \beta$).

By virtue of such construction, it is possible to realize the retention of reproduction compatibility, more accurately, on the basis of the predetermined range of frequency centered on the second frequency ($2m \times Fwb2 \pm \beta$).

In another aspect of the information recording medium of the present invention, predetermined address information is pre-formatted on the basis of the first reference frequency in the recording area.

According to this aspect, in the recording area, the predetermined address information (LPP) is pre-formatted on the basis of the first reference frequency. Here, the "predetermined address information" of the present invention is address information which cannot be detected by the conventional reproducing apparatus that can detect the first address information, such as LPP (Land Pre-Pit), pre-formatted with the first reference frequency and which can hold a simple and proper phase relationship with the predetermined clock information.

As a result, it is possible to pre-format the aforementioned predetermined address information which can hold a simple and proper phase relationship with the predetermined clock information. In addition, as a result, even by the conventional reproducing apparatus that performs reproduction on the conventional recording-type optical disc, such as the wobble of a DVD-R, on which the first address information can be detected, signal processing may be performed on the predetermined address information, substantially as in the frame structure and signal structure of the first address information. Therefore, it is possible to almost or completely eliminate a need to change the structure and the process procedure in the signal processing system (or signal processing circuit) of the address information on the conventional reproducing apparatus.

In another aspect of the information recording medium of the present invention, predetermined address information (LPP) is pre-formatted on the basis of modulation (frequency modulation, phase modulation, or amplitude modulation) of the first reference frequency (Fstd: DVD-R/RW) in the recording area.

According to this aspect, it is possible to pre-format the aforementioned predetermined address information, which can hold a simple and proper phase relationship with the predetermined clock information, highly accurately, on the basis of the various modulation, such as frequency modulation, phase modulation, or amplitude modulation.

In another aspect of the information recording medium of the present invention, an encryption key for encrypting or decrypting the record data is recorded in advance in the recording area.

According to this aspect, it is possible to supply the record data whose copyright is protected by the encryption system, such as a CSS, to a general user using the recording-type information recording medium on which the predetermined clock information described above is pre-formatted, and it is possible to enable the conventional reproducing apparatus to perform the reproduction process on the supplied contents, on the basis of the encryption key, appropriately and easily.

In another aspect of the information recording medium of the present invention, the record data that is encrypted can be recorded in the recording area.

According to this aspect, it is possible to supply the record data whose copyright is protected by the encryption system, such as a CSS, to a general user using the recording-type information recording medium on which the predetermined clock information described above is pre-formatted, and it is possible to enable the conventional reproducing apparatus to perform the reproduction process on the record data obtained by encrypting the supplied contents, appropriately and easily.

In another aspect of the information recording medium of the present invention, management information for managing the information recording medium can be superimposed on the basis of the first reference frequency (Fstd: DVD-R/RW) in the recording area (lead-in area).

According to this aspect, in addition to or instead of the predetermined address information described above, it is possible to pre-format the management information for managing the information recording medium.

As a result, it is possible to enable the conventional reproducing apparatus to perform the process of obtaining the management information, appropriately and easily.

In another aspect of the information recording medium of the present invention, the recording area includes a reproduction setting area which is firstly accessed in reproducing the record data and which is to identify whether or not to allow the reproduction of the record data.

According to this aspect, the reproduction setting area is included in the recording area, wherein the reproduction setting area is firstly accessed in reproducing the record data and it is to identify whether or not to be the recording media in order to judge whether or not to allow the reproduction of the record data. Therefore, since the predetermined clock information that cannot be detected by the conventional reproducing apparatus is pre-formatted in the reproduction setting area, the general information recording/reproducing apparatus cannot distinguish between the information recording medium of the present invention and a general read-only information recording medium, such as a DVD-ROM, in a reproduction process in the recording area. As a result, the conventional reproducing apparatus can perform the reproduction process on the information recording medium of the present invention, as in the general read-only information recording medium.

(Information Recording Apparatus)

Hereinafter, the information recording apparatus of the present invention will be explained.

The above object of the present invention can be also achieved by an information recording apparatus for recording record data onto the information recording medium of the present invention describe above (including its various aspects), the information recording apparatus provided with: a recording device for recording the record data; a detecting device for detecting the predetermined clock information (wobble); a setting device for setting signal processing conditions in the recording (performing a division process on the predetermined clock information), on the basis of the detected predetermined clock information; and a controlling device for controlling the recording device to record the record data, on the basis of the set signal processing conditions.

According to the information recording apparatus of the present invention, the signal processing conditions are set by the setting device on the basis of the predetermined clock information. Here, the "signal processing conditions" of the present invention are various processing conditions for performing the signal processing in the recording or reproduction corresponding to the predetermined clock information, such as performing the division process on the predetermined clock information.

As a result, under the control of the controlling device, the record data can be recorded by the recording device onto the information recording medium described above, appropriately and easily, on the basis of the signal processing conditions.

Consequently, it is possible to supply the contents whose copyright is protected by the encryption system, such as a CSS, to a general user using the recording-type information recording medium on which the predetermined clock information described above is pre-formatted, and it is possible to enable the conventional reproducing apparatus to perform the reproduction process on the supplied contents, appropriately and easily. Therefore, according to the information recording apparatus of the present invention, it is possible to realize both the copyright protection of the contents and the retention of reproduction compatibility.

In response to the various aspects of the aforementioned information recording medium of the present invention, the information recording apparatus of the present invention can also employ various aspects.

(Information Reproducing Apparatus)

Hereinafter, the information reproducing apparatus of the present invention will be explained.

The above object of the present invention can be also achieved by an information reproducing apparatus for reproducing record data from the information recording medium of the present invention described above (including its various aspects), the information reproducing apparatus provided with: a detecting device for detecting the predetermined clock information (wobble); a setting device for setting signal processing conditions in the reproduction (performing the division process on the predetermined clock information), on the basis of the detected predetermined clock information; a reproducing device for decrypting and reproducing the record data on the basis of an encryption key included in the record data; a judging device for judging whether or not the reproduction of the record data is allowed; and a controlling device for controlling the reproducing device to reproduce the record data, if it is judged that the reproduction is allowed.

According to the information reproducing apparatus of the present invention, the signal processing conditions are set by the setting device on the basis of the predetermined clock information.

As a result, if it is judged by the judging device that the reproduction is allowed, it is possible to reproduce the record data from the information recording medium described above, appropriately and easily, while decrypting the record data on the basis of the signal processing conditions, using the reproducing device under the control of the controlling device.

Consequently, it is possible to supply the contents whose copyright is protected by the encryption system, such as a CSS, to a general user using the recording-type information recording medium on which the predetermined clock information described above is pre-formatted, and it is possible to enable the conventional reproducing apparatus to perform the reproduction process on the supplied contents, appropriately and easily. Therefore, according to the information reproducing apparatus of the present invention, it is possible to realize both the copyright protection of the contents and the retention of reproduction compatibility.

In response to the various aspects of the aforementioned information recording medium of the present invention, the information reproducing apparatus of the present invention can also employ various aspects.

(Information Recording Method)

Hereinafter, the information recording method of the present invention will be explained.

The above object of the present invention can be also achieved by an information recording method on an information recording apparatus provided with a recording device for recording record data onto the information recording medium of the present invention described above (including its various aspects), the information recording method provided with: a detecting process of detecting the predetermined clock information (wobble); a setting process of setting signal processing conditions in the recording (performing the division process on the predetermined clock information), on the basis of the detected predetermined clock information; and a controlling process of controlling the recording device to record the record data, on the basis of the set signal processing conditions.

According to the information recording method of the present invention, it is possible to receive various benefits of the aforementioned information recording apparatus of the present invention.

In response to the various aspects of the aforementioned information recording apparatus of the present invention, the information recording method of the present invention can employ various aspects.

(Information Reproducing Method)

Hereinafter, the information reproducing method of the present invention will be explained.

The above object of the present invention can be also achieved by an information reproducing method on an information reproducing apparatus provided with a reproducing device for decrypting and reproducing the record data on the basis of an encryption key included in the record data, from the information recording medium of the present invention described above (including its various aspects), the information reproducing method provided with: a detecting process of detecting the predetermined clock information (wobble); a setting process of setting signal processing conditions in the reproduction (performing the division process on the predetermined clock information), on the basis of the detected predetermined clock information; a judging process of judging whether or not the reproduction of the record data is allowed; and a controlling process of controlling the reproducing device to reproduce the record data, if it is judged that the reproduction is allowed.

According to the information reproducing method of the present invention, it is possible to receive various benefits of the aforementioned information reproducing apparatus of the present invention.

In response to the various aspects of the aforementioned information reproducing apparatus of the present invention, the information reproducing method of the present invention can employ various aspects.

(Computer Program)

Hereinafter, the computer program of the present invention will be explained.

The above object of the present invention can be also achieved by a first computer program for recording control and for controlling a computer provided in the information recording apparatus of the present invention described above (including its various aspects), the first computer program making the computer function as at least one portion of the recording device, the detecting device, the setting device, and the controlling device.

The above object of the present invention can be also achieved by a second computer program for reproduction control and for controlling a computer provided in the information reproducing apparatus of the present invention described above (including its various aspects), the second computer program making the computer function as at least one portion of the reproducing device, the detecting device, the setting device, the judging device, and the controlling device.

According to the first and second computer programs of the present invention, the information recording apparatus and the information reproducing apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the information recording apparatus and the information reproducing apparatus of the present invention, each of the computer programs of the present invention can also employ various aspects.

The above object of the present invention can be also achieved by a first computer program product in a computer-readable medium for tangibly embodying a program of instructions executable by a computer provided in the aforementioned information recording apparatus of the present invention (including its various aspects), the computer program product making the computer function as at least one portion of the recording device, the detecting device, the setting device, and the controlling device.

The above object of the present invention can be also achieved by a second computer program product in a computer-readable medium for tangibly embodying a program of instructions executable by a computer provided in the aforementioned information reproducing apparatus of the present invention (including its various aspects), the computer program product making the computer function as at least one portion of the reproducing device, the detecting device, the setting device, the judging device, and the controlling device.

According to the first or second computer program product of the present invention, the aforementioned information recording apparatus or information reproducing apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned information recording apparatus or information reproducing apparatus of the present invention.

As explained above, according to the information recording medium of the present invention, it is provided with the recording area in which the predetermined clock information is pre-formatted, wherein (i) the predetermined clock information is included in the first frequency band which can be defined by the first reference frequency, and (ii) the predetermined clock information is defined by the frequency that is an integral multiple of the first reference frequency. Consequently, it is possible to supply the contents whose copyright is protected by the encryption system, such as a CSS, to a general user using the recording-type information recording medium on which the predetermined clock information described above is pre-formatted, and it is possible to enable the conventional reproducing apparatus to perform the reproduction process on the supplied contents, appropriately and easily. Therefore, according to the information recording medium of the present invention, it is possible to realize both the copyright protection of the contents and the retention of reproduction compatibility.

Moreover, according to the information recording apparatus of the present invention, it is provided with the recording device, the detecting device, the setting device, and the controlling device. According to the information recording method of the present invention, it is provided with the recording process, the detecting process, the setting process, and the controlling process. Consequently, it is possible to supply the contents whose copyright is protected by the encryption system, such as a CSS, to a general user using the recording-type information recording medium on which the predetermined clock information described above is pre-formatted, and it is possible to enable the conventional reproducing apparatus to perform the reproduction process on the supplied contents, appropriately and easily. Therefore, according to the information recording apparatus of the present invention, it is possible to realize both the copyright protection of the contents and the retention of reproduction compatibility.

Moreover, according to the information reproducing apparatus of the present invention, it is provided with the reproducing device, the detecting device, the setting device, the judging device, and the controlling device. According to the information reproducing method of the present invention, it is provided with the detecting process, the setting process, the judging process, and the controlling process. Consequently, it is possible to supply the contents whose copyright is protected by the encryption system, such as a CSS, to a general user using the recording-type information recording medium on which the predetermined clock information described above is pre-formatted, and it is possible to enable the conventional reproducing apparatus to perform the reproduction process on the supplied contents, appropriately and easily. Therefore, according to the information reproducing apparatus of the present invention, it is possible to realize both the copyright protection of the contents and the retention of reproduction compatibility.

Moreover, according to the computer program of the present invention, it makes the computer function as the information recording apparatus and the information reproducing apparatus of the present invention. Thus, it is possible to enable the information recording apparatus and the information reproducing apparatus to supply the contents whose copyright is protected by the encryption system, such as a CSS, to a general user using the recording-type information recording medium on which the predetermined clock information described above is pre-formatted, and it is possible to enable the conventional reproducing apparatus to perform the reproduction process on the supplied contents, appropriately and easily. Therefore, according to the computer program of the present invention, it is possible to realize both the copyright protection of the contents and the retention of reproduction compatibility, using the information recording apparatus and the information reproducing apparatus.

These effects and other advantages of the present invention will become more apparent from the embodiments explained below.

BRIEF DESCRIPTION OF DRAWINGS

FIG. 1 is a substantial plan view showing the basic structure of an optical disc with a plurality of recording areas, which is an information recording medium in an embodiment of the present invention, and a conceptual view showing a recording area structure in its radial direction, corresponding to the substantial plan view.

FIG. 2 is a partially enlarged perspective view showing a recording surface of the optical disc in the embodiment of the information recording medium of the present invention.

FIG. 3 is a conceptual graph showing a relationship between a recording area on the optical disc in the embodiment of the information recording medium of the present invention and an address that can specify a position in the recording areas.

FIG. 4 is a schematic diagram schematically showing the recording areas of the optical disc in the embodiment of the information recording medium of the present invention, predetermined clock information and predetermined address information, which are pre-formatted in the recording areas.

FIG. 5 are a schematic diagram (FIG. 5(a)) schematically showing the predetermined clock information and the predetermined address information in the optical disc in the embodiment of the information recording medium of the present invention, and a schematic diagram (FIG. 5(b)) schematically showing clock information and first address information based on a first reference frequency in an optical disc in a comparison example.

FIG. 6 is a graph schematically showing the frequency of the predetermined clock information included in a first frequency band in the embodiment of the information recording medium of the present invention.

FIG. 7 are a logical block diagram (FIG. 7(a)) schematically showing a procedure of quantifying an self-correlation in the embodiment of the information recording medium of the present invention, and one timing chart (FIG. 7(b)) schematically showing a process of deriving a counter value, which indicates the extent of the self-correlation.

FIG. 8 is another timing chart schematically showing the process of deriving the counter value, which indicates the extent of the self-correlation in the embodiment of the information recording medium of the present invention.

FIG. 9 is a block diagram showing the overall structure of the information recording apparatus or information reproducing apparatus in an embodiment of the present invention.

FIG. 10 is a flowchart showing a process of reproducing record data by an information recording/reproducing apparatus in the embodiment of the information recording apparatus of the present invention.

FIG. 11 is a flowchart showing a process of recording the record data by the information recording/reproducing apparatus in the embodiment of the information recording apparatus of the present invention.

FIG. 12 is a graph schematically showing the frequency of the predetermined clock information included in the first frequency band in another embodiment (part 1) of the information recording medium of the present invention.

FIG. 13 are schematic diagram (FIG. 13(a)) schematically showing the predetermined clock information and the predetermined address information in the optical disc in the another embodiment (part 1) of the information recording medium of the present invention, and a schematic diagram (FIG. 13(b)) schematically showing the clock information and the first address information based on the first reference frequency in the optical disc in the comparison example.

FIG. 14 is a graph schematically showing the frequency of the predetermined clock information included in a second frequency band in another embodiment (part 2) of the information recording medium of the present invention.

FIG. 15 are a logical block diagram (FIG. 15(a)) schematically showing a judgment procedure in a conventional reproducing apparatus for judging, on the basis of band pass filtering, whether or not the frequency of the clock information can be detected (or identified) as the first reference frequency (Fstd), in another embodiment (part 3) of the information recording medium of the present invention, and a graph (FIG. 15(b)) schematically showing a spectrum obtained on the basis of the band pass filtering.

FIG. 16 is a schematic diagram schematically showing one specific example of the effect of the present invention.

FIG. 17 is a block diagram schematically showing a general mechanism of copyright protection.

DESCRIPTION OF REFERENCE CODES

1 . . . center hole, 10 . . . track, 11 . . . ECC block, 100 . . . optical disc, 101 . . . lead-in area, 102 . . . data area, 103 . . . lead-out area, 200 . . . information recording/reproducing apparatus, CDZ . . . control data zone, RMA . . . recording management area, LB . . . laser light, WBL . . . wobble (one example of predetermined clock information), LPP . . . land pre-pit (one example of predetermined address information)

BEST MODE FOR CARRYING OUT THE INVENTION

Hereinafter, the best mode for carrying out the present invention will be explained in each embodiment in order with reference to the drawings.

(1) Information Recording Medium in Embodiment

Next, with reference to FIG. 1 to FIG. 16, a detailed explanation will be given on an information recording medium in an embodiment of the present invention.

(1-1) Basic Structure (Physical Structure)

Firstly, with reference to FIG. 1 and FIG. 2, the basic structure of an optical disc in an embodiment of the information recording medium of the present invention will be explained. FIG. 1 is a substantial plan view showing the basic structure of the optical disc with a plurality of recording areas, which is an information recording medium in an embodiment of the of the present invention, and a conceptual view showing a recording area structure in its radial direction, corresponding to the substantial plan view. FIG. 2 is a partially enlarged perspective view showing a recording surface of the optical disc in the embodiment of the information recording medium of the present invention.

As shown in FIG. 1, an optical disc 100 has a recording surface on a disc main body with a diameter of about 12 cm, as is a DVD. On the recording surface, the optical disc 100 is provided with: a center hole 1 as a center fs; (i) a power calibration area PCA, (ii) a recording management area RMA as one specific example of the management area of the present invention, (iii) a lead-in area 101 having a control data zone CDZ as another example of the management area of the present invention; (iv) a data area 102; and (v) a lead-out area 103, which are associated with the embodiment. Then, for example, on a not-illustrated transparent substrate of the optical disc 100, there is at least one recording layer laminated. In each recording area of the recording layers, for example, a track or tracks 50, such as groove tracks and land tracks, are alternately placed, spirally or concentrically, centered on the center hole 1. Moreover, on the track 50, record information (data) is divided and recorded by a unit of ECC block 51. The ECC (Error Correction Code) block 51 is a record information management unit by which the record information is error-correctable.

More specifically, as shown in FIG. 2, in the optical disc 100 in the embodiment, a pigment-type or phase-change-type recording layer 107, which constitutes an information recording surface, is laminated on the lower side of the disc-shaped transparent substrate 106, and a reflective layer 108 is laminated on the lower side thereof. The information recording surface formed of the recording layer 107 has grove track GT and land tracks LT alternately formed. Incidentally, in the recording and reproduction of the optical disc 100, for example, as shown in FIG. 2, laser light LB is irradiated on the grove tracks GT through the transparent substrate 106. For example, in the recording, the laser light LB is irradiated with a recording laser power, to thereby perform the recording into the recording layer 107 in accordance with the record data. On the other hand, in the reproduction, the laser light LB is irradiated with a reproduction laser power, which is weaker than the recording laser power, to thereby read the record data recorded in the recording layer 107.

In particular, in the data area 102, encryption information, such as a title key, based on an encryption system, such as a CSS, and encrypted contents encrypted by using the encryption information, such as a title key, are recorded. More specifically, the encryption information, such as a title key, is encrypted by using encryption information, such as a disk key and a disk key set.

Incidentally, the present invention is not particularly limited to the optical disc having these five areas. For example, even if the lead-in area 101 or the lead-out area 103 does not exist, a data structure explained below can be constructed. Moreover, as described later, the lead-in area 101 or the lead-out area 103 may be further segmentized.

(1-2) Address that can Specify a Position in a Recording Area of the Optical Disc Next, with reference to FIG. 3, a relationship between the recording area on the optical disc and an address that can specify a position in the recording area will be explained. FIG. 3 is a conceptual graph showing the relationship between the recording area on the optical disc in the embodiment of the information recording medium of the present invention and the address that can specify a position in the recording area. Incidentally, the vertical axis in FIG. 3 indicates the value of the address, such as a sector number and a land pre-pit address, and the horizontal axis indicates a relative position in the radial direction of the optical disc. Moreover, one specific example of the "address" of the present invention is constructed, for example, of LBN (Logical Block Number), a physical sector number (or sector number) which constitutes an ECC block, or a land pre pit address.

As shown in FIG. 3, the recording area of the optical disc 100 in the embodiment of the information recording medium of the present invention is provided, as described above, with: (i) the power calibration area PCA, (ii) the recording management area RMA, (iii) the lead-in area 101 having a control data zone CDZ; (iv) the data area 102; and (v) the lead-out area 103, from the inner circumferential side to the outer circumferential side. Incidentally, various management information may be recorded in the RMA and the CDZ. Here, the management information is various information for managing the information recording medium, such as (ii-1) information about recording features, such as an optimum recording power, (ii-2) attribute information for specifying the type of the medium, and (ii-3) information for specifying a position in various recording layers. In particular, the encryption key of the present invention may be recorded in advance (i.e. pre-recorded) in the CDZ, for example, under management by a content holder. On the other hand, the record data, such as contents, that is encrypted by the encryption key may be recorded by an information recording/reproducing apparatus, described later, corresponding to the optical disc.

Moreover, as shown in FIG. 3, if the address that can uniquely specify a position in the recording area of the aforementioned optical disc 100 is the physical sector number (or sector number) constituting an ECC block, the address in the recording area of the optical disc 100 may increase as an optical pickup is displaced from the inner circumferential side to the outer circumferential side (refer to a thick solid line in FIG. 3). Alternatively, if the address that can uniquely specify a position in the recording area of the aforementioned optical disc 100 is the land pre pit address, the address in the recording area of the optical disc 100 may decrease as an optical pickup is displaced from the inner circumferential side to the outer circumferential side (refer to a thin dotted line in FIG. 3).

(1-3) One Specific Example of Predetermined Clock Information and Predetermined Address Information Next, with reference to FIG. 4 and FIG. 5, an explanation will be given on one specific example of predetermined clock information and predetermined address information in the embodiment. FIG. 4 is a schematic diagram schematically showing (i) the recording areas of the optical disc in the embodiment of the information recording medium of the present invention, (ii) the predetermined clock information and (iii) the predetermined address information, which are pre-formatted in the recording areas. FIG. 5 are a schematic diagram (FIG. 5($a$)) schematically showing the predetermined clock information and the predetermined address information in the optical disc in the embodiment of the information recording medium of the present invention, and a schematic diagram (FIG. 5($b$)) schematically showing clock information and first address information based on a first reference frequency in an optical disc in a comparison example. Incidentally, in the optical disc shown in FIG. 4, contents whose copyright is protected are recorded on the basis of the encryption by the encryption system, such as a CSS (Content Scramble System), through a finalize process, i.e. various compatibility processes in order to be reproduced by a reproducing apparatus based on a first reference frequency.

As shown in FIG. 4, in the recording area of the optical disc in the embodiment, wobbles "WBL" (i.e. one specific example of the "predetermined clock information" of the present invention) defined by a frequency "Fwb1" which is twice the first reference frequency, are pre-formatted. The "first reference frequency" of the present invention is a frequency which is a reference, such as a frequency of the clock information (e.g., wobble) pre-formatted on the conventional recording-type optical disc, such as a DVD-R or a DVD-RW. Specifically, as shown in FIG. 5($b$), in the optical disc in the comparison example, eight wobbles "WBLstd" are formed in one sync frame on the basis of the first reference frequency "Fstd". In other words, one Even sync frame is constituted by WBLstd "1" to WBLstd "8", and one Odd sync frame is constituted by WBLstd "9" to WBLstd "16". In addition, address information "LPPstd" (i.e. one specific example of the "first address information" of the present invention), such as LPP (Land Pre-Pit), pre-formatted with the first reference frequency, is formed at the three peaks from the first peak in each one sync frame, i.e. substantially in each eight wobbles.

In contrast, in the optical disc in the embodiment, as shown in FIG. 4 and FIG. 5($a$), 16 wobbles "WBL" are formed in one sync frame. In other words, one Even sync frame is constituted by WBL "1" to WBL "16", and one Odd sync frame is formed of WBL "17" to WBL "32".

In addition, there are only three land pre-pits (i.e. one specific example of the "predetermined address information" of the present invention) (hereinafter referred to as "LPP" as occasion demands) formed in each one sync frame, i.e. substantially in each 16 pieces of wobbles (or 16 wobbles). The three LPPs are formed in the six wobbles from the first wobble. In other words, the three LPPs are formed by a unit of a group (or pair) of two wobbles, at the first wobbles of the units, respectively. That is, a cycle "Tstd" in which the LPPs are formed shown in FIG. 5($a$), is equal to a cycle "Tstd" in which the address information "LPPstd" s are formed shown in FIG. 5($b$). Therefore, in the optical disc in the embodiment, by using the predetermined address information, it is possible to constitute the address information at the conventional formation frequency (i.e. area resolution) based on the first reference frequency. Moreover, the predetermined address information may be not constituted by the LPPs but constituted by modulating the wobble (i.e., predetermined clock information) on the basis of a frequency, phase, or amplitude, for example. Moreover, the LPP is constructed to include the address information and a timing signal for synchronizing the data recording and reproduction. More specifically, among the three LPPs, at least one LPP has the clock information for synchronization, recorded therein. The other LPPs has the address information and information for controlling the data recording or the like, recorded therein.

Incidentally, 26 pieces of the two types of sync frames (i.e., Even sync frame or Odd sync frame) described above constitute a sector with a data size of 2 KB (Kilo Bytes), and 16 pieces of sectors constitute one ECC block with a data size of 32 KB.

As a result, the frequency of the wobbles "WBL" (one example of the predetermined clock information) is twice (i.e., an integral multiple of) the first reference frequency (Fstd: reference frequency for DVD-R/RW). Thus, it is possible to pre-format the predetermined address information "LPP", (i) which cannot be detected by the conventional reproducing apparatus that can detect the address information "LPPstd" (i.e. one specific example of the "first address information" of the present invention), such as LPP (Land Pre-Pit), pre-formatted with the first reference frequency and (ii) which can hold a simple and proper phase relationship with the predetermined clock information.

If the frequency of the wobbles "WBL" (one example of the predetermined clock information) is not an integral multiple of the first reference frequency, the specification (or definition) of the phase relationship between (i) the wobble "WBL" (one example of the predetermined clock information) and (ii) the predetermined address information "LPP" will have complexity in a process of detecting a push-pull signal in the reproduction by the conventional reproducing apparatus. And the process of detecting the predetermined address information "LPP" will possibly become technically difficult.

In contrast, the frequency of the wobbles "WBL" (one example of the predetermined clock information) in the embodiment is twice (i.e., an integral multiple of) the first reference frequency (Fstd: reference frequency for DVD-R/RW). Thus, it is possible to pre-format the wobbles "WBL" by pre-formatting the predetermined address information near a position corresponding to the peak of the wobble (i.e. a position at which the wobble has the maximum amplitude), pre-formatted on the conventional recording-type optical disc, such as the wobble of a DVD-R or a DVD-RW. As a result, it is possible to pre-format the wobbles "WBL" which can hold a simple and proper phase relationship with the predetermined clock information.

In addition, the frequency of the wobbles "WBL" (one example of the predetermined clock information) in the embodiment is twice (i.e., an integral multiple of) the first reference frequency (Fstd: reference frequency for DVD-R/RW). Thus, even by the conventional reproducing apparatus that performs reproduction on the conventional recording-type optical disc, such as the wobble of a DVD-R, on which the first address information can be detected, signal processing may be performed on the predetermined address information, substantially as in the frame structure and signal structure of the first address information. Therefore, it is possible to almost or completely eliminate a need to change the structure or the process procedure in the signal processing system (or signal processing circuit) of the address information on the conventional reproducing apparatus.

Moreover, in addition, in the recording area provided for the information recording medium, the wobbles "WBL" (one example of the predetermined clock information) or the predetermined address information "LPP" described above are pre-formatted at all positions. Therefore, in recording the record data, it is possible to record the record data at any position on the basis of one type of signal processing, for example, so that additional recording or rewriting may be performed highly accurately, as compared to the recording based on a plurality types of signal processing.

(1-4) One Specific Example of First Reference Frequency

Next, with reference to FIG. 6 to FIG. 8, one specific example of the first reference frequency will be explained. FIG. 6 is a graph schematically showing the frequency of the predetermined clock information included in the first frequency band in the embodiment of the information recording medium of the present invention. FIG. 7 are a logical block diagram (FIG. 7(a)) schematically showing a procedure of quantifying an self-correlation in the embodiment of the information recording medium of the present invention, and one kind of timing chart (FIG. 7(b)) schematically showing a process of deriving a counter value, which indicates the extent of the self-correlation. FIG. 8 is another kind of timing chart schematically showing a process of deriving a counter value, which indicates the extent of the self-correlation in the embodiment of the information recording medium of the present invention. Incidentally, the horizontal axis in FIG. 6 indicates frequency, and the vertical axis indicates the counter value (e.g., value of integral), which indicates the extent of the self-correlation.

As shown in FIG. 6, the frequency of the wobbles "WBL" (one example of the predetermined clock information) described above (i.e. the frequency "Fwb1" that is twice the first reference frequency) is included in a first frequency band which can be defined by the first reference frequency "Fstd". Here, the "first frequency band" in the embodiment means a frequency band that is not detected as the first reference frequency by the conventional reproducing apparatus for judging whether or not the frequency of the clock information can be detected (or identified) as the first reference frequency (Fstd) on the basis of the self-correlation. Moreover, the "self-correlation" in the embodiment, is a correlation between one variable indicating a signal feature and another variable indicating the signal feature, defined to make the signal feature, such as a frequency, amplitude, or phase, inductively quantitative or qualitative, in various signal, such as a wobble signal.

Specifically, the first frequency band is a frequency band in which the counter value, which means the extent of the self-correlation, corresponds to a smaller counter value than a predetermined threshold value in a characteristic curve indicating the self correlation based on the first reference frequency, as shown in a right-shaded hatched area in FIG. 6. That is, the following equation (1) can indicate the first frequency band.

$$\{(2n) \times \text{Fstd} - \alpha\} < (\text{first frequency band}) < \{(2n) \times \text{Fstd} + \alpha\} \quad (1)$$

wherein, "n" is an integer number, and α is a predetermined bandwidth that cannot be detected on the basis of the resolution of the signal processing.

More specifically, the counter value, which means the extent of the self-correlation, is quantified by a logical block shown in FIG. 7(a). That is, if it is judged on the basis of the self-correlation whether or not the frequency of the clock information, such as a wobble signal, can be detected (or identified) as the first reference frequency (Fstd), at first step (or firstly), the clock information, such as a wobble signal, is binarized. At second step (or Secondly), the binarized clock information is inputted to a logical block "XOR" for calculating exclusive OR value (refer to a signal "a" in FIG. 7(a)). Simultaneously with or in tandem with this second step, at third step (or thirdly), the binarized clock information is inputted to a logical block "Delay" for delay by half of a reference cycle (Tstd) corresponding to the first reference frequency (Fstd). At forth step (or Fourthly), in the logical block "XOR" for calculating exclusive OR value, the exclusive OR value of (i) the binarized clock information (refer to the signal "a" in FIG. 7(a)) and (ii) the clock information (refer to a signal "b" in FIG. 7(a)) which is binarized and which is delayed by half of the reference cycle (Tstd) is calculated. At fifth step (or Fifthly), the calculated value of the exclusive OR (refer to a signal "c" in FIG. 7(a)) is inputted to a counter for performing integration.

For example, as one example, as shown in FIG. 7(b), if the "signal a" (i.e. "1", "1", "1", "0", "0", "0"), which is the binarized clock information and whose cycle is the reference cycle (Tstd) corresponding to the first reference frequency (Fstd), is inputted to the logical block shown in FIG. 7(a), the "signal a" and the "signal b" (i.e. "1", "1", "0", "0", "0") which is obtained by delaying the "signal a" by half of the reference cycle (Tstd), are inputted to the logical block "XOR". Then, in the logical block "XOR", the exclusive OR value of (i) a value (i.e. "0", "0", "0") corresponding to a latter half cycle of the "signal a" and (ii) a value (i.e. "1", "1", "1") corresponding to a former half cycle of the "signal b" is calculated. And the "signal c" (i.e. "1", "1", "1") is inputted to the counter for performing integration. Therefore, using the counter, the calculated value of integration, i.e. a counter value "3(=1+1+1)" is obtained. As described above, by using (i) the first reference frequency (Fstd), which is the frequency of the binarized clock information described above, and (ii) the counter value "3" described above (i.e. one example of the maximum value "Max" in FIG. 6), it is possible to plot a point "P1" shown in FIG. 6.

In contrast to this, as shown in FIG. 8, if the "signal a" (i.e. "1", "1", "1", "0", "0", "0"), which is the binarized clock information and whose cycle is a cycle (Tstd/2) corresponding to the frequency "Fwb1" that is twice the first reference frequency (Fstd), is inputted to the logical block shown in FIG. 7(a), the "signal a" and the "signal b" (i.e. "1", "1", "1", "0", "0", "0") which is obtained by delaying the "signal a" by half of the reference cycle (Tstd), are inputted to the logical block "XOR". Then, in the logical block "XOR", the exclusive OR value of (i) a value (i.e. "1", "1", "1") corresponding to a former half cycle of a next cycle of the "signal a" and (ii) a value (i.e. "1", "1", "1" corresponding to a former half cycle of the "signal b" is calculated. And the "signal c" (i.e. "0", "0", "0") is inputted to the counter for performing integration. Therefore, using the counter, the calculated value of integration, i.e. a counter value "0 (=0+0+0)" is obtained. As described above, by using (i) the frequency (Fwb1) that is twice the first reference frequency, which is the frequency of the binarized clock information described above, and (ii) the counter value "0" described above (i.e. one example of the counter value "0" in FIG. 6), it is possible to plot a point "P2" shown in FIG. 6.

As described above, the frequency of the wobbles "WBL" (one example of the predetermined clock information) described above, i.e. the frequency "Fwb1" that is twice the first reference frequency (Fstd: frequency for DVD-R/RW), is included in the first frequency band, which is a frequency band that is not detected as the first reference frequency by the conventional reproducing apparatus for judging whether or not the frequency of the clock information can be detected (or identified) as the first reference frequency (Fstd) on the basis of the self-correlation.

As a result, for example, a reproduction setting area is included in the recording area, wherein the reproduction setting area is firstly accessed in reproducing the record data and the reproduction setting area is to identify whether or not to be the recording media in order to judge whether or not to allow the reproduction of the record data. Therefore, since the pre-determined clock information that cannot be detected by the conventional reproducing apparatus (or general information recording/reproducing apparatus), is pre-formatted in the recording area including the reproduction setting area, the general information recording/reproducing apparatus cannot distinguish between (i) the information recording medium of the present invention and (ii) a general read-only information recording medium, such as a DVD-ROM, in a reproduction process in the recording area. As a result, the conventional reproducing apparatus can perform the reproduction process on the information recording medium of the present invention, as in the general read-only information recording medium.

Consequently, it is possible to supply the contents whose copyright is protected by the encryption system, such as a CSS, to a general user using the recording-type information recording medium on which the wobbles "WBL" (one example of the predetermined clock information) described above are pre-formatted. And it is possible to enable the conventional reproducing apparatus to perform the reproduction process on the supplied contents, appropriately and easily. Therefore, according to the optical disc in the embodiment, it is possible to realize both the copyright protection of the contents and the retention of reproduction compatibility.

(2) Information Recording Apparatus and Information Reproducing Apparatus

Next, with reference to FIG. 9 to FIG. 11, an explanation will be given on an embodiment associated with the information recording apparatus and the information reproducing apparatus of the present invention.

(2-1) Basic Structure

Firstly, with reference to FIG. 9, an explanation will be given on the basic structure of the embodiment associated with the information recording apparatus and the information reproducing apparatus of the present invention. FIG. 9 is a block diagram showing the overall structure of the information recording apparatus or information reproducing apparatus in the embodiment of the present invention.

As shown in FIG. 9, an information recording/reproducing apparatus 200 is provided with: an optical pickup 202 for emitting a reproduction beam to the optical disc 100 and outputting a signal corresponding to reflected light; a spindle motor 203 for controlling the rotation of the optical disc 100; and a servo unit 222. The servo unit 222 is supplied with a first clock signal CK1 and a pit synchronization signal SYNCp. In synchronization with these signals, the servo unit 222 performs tracking servo and focus servo for relative position control of the optical pickup 202 for the optical disc 100, and spindle servo for controlling the rotation of the spindle motor 203. Incidentally, for example, on the optical disc 100, pit data DP synchronized with the first clock signal CK1 is recorded by the length of a record mark. The record mark in this example is a pit, and the track is formed of a pit row. The track has a meandering shape according to a wobble signal WB, which is obtained by modulating wobble data DW. The wobble signal WB is synchronized with a second clock signal CK2. The first clock signal CK1 has an N-fold frequency ("N" is an integer number) of that of the second clock signal CK2. In this example, N=25, the second clock signal CK2 is 420 KHz, and the first clock signal CK1 is 10.5 MHz.

The optical pickup 202 is provided with a laser diode for irradiating the reproduction beam; and a four-division detection circuit (not illustrated). The four-division detection circuit divides the reflected light of the reproduction beam into four areas 1A, 1B, 1C, and 1D shown in the upper part of FIG. 9, and outputs each signal corresponding to the quantity of light in respective one of the areas. A head amplifier 204 amplifies each output signal of the optical pickup 202, and outputs a divisional read signal 1a corresponding to the area 1A, a divisional read signal 1b corresponding to the area 1B, a divisional read signal 1c corresponding to the area 1C, and a divisional read signal 1d corresponding to the area 1D.

A sum generation circuit 210 is provided with an adder circuit for adding the divisional read signals 1a, 1b, 1c, and 1d and outputting a sum read signal SRF. Incidentally, the sum read signal SRF is a signal which represents the length of the record mark.

A pit data demodulation circuit 211 reproduces the pit data DP on the basis of the sum read signal SRF, and generates the first clock signal CK1. More specifically, the pit data demodulation circuit 211 demodulates the reproduced pit data DP by using a predetermined table and generates reproduction data. For example, if EFM modulation is employed as a modulating method, a process of converting 14-bit pit data DP to 8-bit reproduction data is performed. Then, a descramble process is performed in which the order of the reproduction data is rearranged in accordance with a predetermined rule, and the processed reproduction data is outputted.

The reproduction data obtained in this manner is supplied to a pit data correction circuit 212 shown in FIG. 9, on which an error correction process and an interpolation process are performed, and then it is stored into a buffer 213. An interface 214 sequentially reads the data stored in the buffer 213, converts it in a predetermined output format, and outputs it to external equipment. Moreover, various data is inputted from and outputted to e.g. the aforementioned line connecting apparatus connected to the external network 400, through the interface 214.

A push-pull signal generation circuit 220 generates a push-pull signal by calculating $(1a+1d)-(1b+1c)$. The component $1a$ and $1d$ corresponds to the areas 1A and 1D which are on the left side with respect to the reading direction, while the component $1b$ and $1c$ corresponds to the areas 1B and 1C which are on the right side with respect to the reading direction. That is, if the reproduction beam inclines to the left side with respect to the pit, the push-pull signal will have positive polarity. If the reproduction beam is positioned in the center of the pit, the value of the push-pull signal will be in the amplitude center thereof. If the reproduction beam inclines to the right side with respect to the pit, the push-pull signal will have negative polarity. The relative position between the reproduction beam and the pit changes according to the meandering of the track, and the value of the push-pull signal represents the relative position between the reproduction beam and the pit. That is the push-pull signal is a signal corresponding to the meandering of the track.

The push-pull signal is outputted through a low pass filter 221 to the servo unit 222. The servo unit 222 performs tracking control on the basis of the push-pull signal. Moreover, the push-pull signal is supplied to a band pass filter 223. The pass band of the band pass filter 223 is set to extract the wobble signal WB obtained by the modulation of the wobble data DW upon recording, from the push-pull signal. Therefore, the band pass filter 223 constitutes the aforementioned detecting device with the push-pull signal generation circuit 220, and the output signal thereof is corresponding to the wobble signal WB reproduced from the optical disc 100.

A division frequency circuit (or a frequency dividing circuit) 226 changes the frequency of the wobble signal "1/N (wherein "N" is an integer number)"-fold. Therefore, by changing the frequency of the aforementioned wobbles "WBL" pre-formatted on the optical disc in the embodiment, ½-fold, it is possible to make the signal processing through the division frequency circuit 226 substantially equivalent to the conventional signal processing in the first reference frequency.

The CPU 250 controls each of the constituent elements of the information recording/reproducing apparatus 200.

(2-2) Operation Principle (Reproduction Process)

Next, with reference to FIG. 10, an explanation will be given on a reproduction process as an operation principle of the information recording/reproducing apparatus in the embodiment of the information recording apparatus of the present invention. FIG. 10 is a flowchart showing the process of reproducing record data by the information recording/reproducing apparatus in the embodiment of the information recording apparatus of the present invention.

As shown in FIG. 10, in the reproduction process, firstly, the information recording medium is inserted by a user (step S101).

Then, under the control of the CPU 250, it is judged whether or not various management information can be obtained from the control data zone CDZ, for example (step S102). Incidentally, if the finalize process is not performed on the optical disc, the management information cannot be obtained from the optical disc.

Here, if the various management information can be obtained (the step S102: Yes), the various management information is obtained from the control data zone CDZ or the like, under the control of the CPU 250 (step S103).

Then, under the control of the CPU 250, it is judged whether or not to reproduce the record data, such as contents, recorded on the optical disc (step S104). If the record data, such as contents, is to be reproduced (the step S104: 'Yes), moreover it is judged whether or not to reproduce the record data, such as contents, on the basis of the encryption system, such as a CSS, under the control of the CPU 250 (step S105). Here, for example, if the record data, such as contents, is to be reproduced on the basis of the encryption system, such as a CSS (the step S105: 'Yes), moreover, it is judged whether or not the wobble signal is detected, i.e. whether or not the frequency of the clock information, such as the wobble signal, described above can be detected (or identified) as the first reference frequency (Fstd) on the basis of the self-correlation, under the control of the CPU 250 (step S106). If the wobble signal is not detected, i.e. if the frequency of the clock information, such as the wobble signal, described above cannot be detected (or identified) as the first reference frequency (Fstd) (the step S106: No), the reproduction of the record data, such as contents, is allowed and the record data is reproduced under the control of the CPU 250 (step S107). Specifically, even if the contents whose copyright is protected by the CSS are recorded on the optical disc, it is considered to have the same conventional DVD-Video standard. Thus, in substantially the same manner as the conventional DVD-Video standard, it is possible to reproduce the contents while obtaining an encryption or decryption key and cancelling the copyright protection (i.e. De-CSS) in accordance with a reproduction instruction.

On the other hand, as a result of the judgment in the step S106 described above, if the wobble signal is detected, i.e. if the frequency of the clock information, such as the wobble signal, described above can be detected (or identified) as the first reference frequency (Fstd) (the step S106: Yes), the reproduction of the record data, such as contents, is not allowed under the control of the CPU 250 (step S108). Moreover, on the other hand, as a result of the judgment in the step S105 described above, if the record data, such as contents, is not to be reproduced on the basis of the encryption system, such as a CSS (the step S105: No), the data on the optical disc is judged to be the record data whose copyright protection is unnecessary, under the control of the CPU 250, and the reproduction of the record data is allowed and the record data is reproduced (step S109).

Then, under the control of the CPU 250, it is judged whether or not the information recording medium is to be ejected (step S110). Here, if the information recording medium is to be ejected (the step S110: Yes), or as a result of the judgment in the step S102 described above, if the various management information cannot be obtained (the step S102: No), an ejection operation is performed under the control of the CPU 250 (step S111).

On the other hand, as a result of the judgment in the step S110 described above, if the information recording medium is not to be ejected (the step S110: No), as described above, it is judged whether or not to reproduce the record data, such as contents, recorded on the optical disc under the control of the CPU 250 (the step S104).

(2-3) Operation Principle (Recording Process)

Next, with reference to FIG. 11, an explanation will be given on a recording process on the optical disc in the embodiment, on the information recording/reproducing apparatus in the embodiment of the information recording apparatus of the present invention. FIG. 11 is a flowchart showing the recording process on the optical disc in the embodiment, by the information recording/reproducing apparatus in the embodiment of the information recording apparatus of the present invention.

As shown in FIG. 11, in the reproduction process, firstly, the information recording medium is inserted by a user (step S201).

Then, under the control of the CPU 250, the various management information is obtained from the control data zone CDZ, for example (step S202).

Then, under the control of the CPU 250, the various management information is obtained from the recording management area RMA, for example (step S203).

Then, under the control of the CPU 250, it is judged whether or not to be the optical disc on which the wobbles "WBL" (i.e. the predetermined clock information) described above are pre-formatted, on the basis of the management information, such as version information about the optical disc, on the basis of the management information that can be obtained from the LPP formed in the CDZ, RMA, or a lead-in area, for example (step S204). Here, if it is judged to be the optical disc on which the wobbles "WBL" (i.e. the predetermined clock information) described above are pre-formatted (the step S204: Yes), for example, various signal processing conditions corresponding to the wobbles "WBL" (i.e. the predetermined clock information) described above are set (step S205). As described above, on the optical disc in the embodiment, the predetermined clock information is formed using the frequency that is twice, i.e., an integral multiple of the first reference frequency. Thus, by adding the process of dividing, i.e. the process of increasing the frequency "½"-fold while matching with the phase of the LPP described above, the signal processing can be performed in almost or completely the same manner as the conventional manner, with regard to the conventional LPP signal processing conditions (signal processing system) and the wobble signal processing conditions.

On the other hand, as a result of the judgment in the step S204 described above, if it is judged not to be the optical disc on which the wobbles "WBL" (i.e. the predetermined clock information) described above are pre-formatted, i.e. if it is judged to be the conventional general optical disc (the step S204: NO), for example, the various signal processing conditions corresponding to the wobble corresponding to the first reference frequency (Fstd) are set (step S206).

Then, under the control of the CPU 250, it is judged whether or not to record the record data (step S207). Here, if the record data is to be recorded (the step S207: Yes), the record data is recorded by a predetermined amount, on the basis of the signal processing conditions, under the control of the CPU 250 (step S208).

Then, under the control of the CPU 250, it is judged whether or not to perform the finalize process on the optical disc (step S209). Here, if the finalize process is to be performed on the information recording medium (step S209: Yes), the various management information recorded in the recording management area RMA is updated, under the control of the CPU 250 (step S210), Then, under the control of the CPU 250, the finalize process is performed on the information recording medium (step S211).

On the other hand, as a result of the judgment in the step S207 described above, if the record data is not to be recorded (the step S207: No), moreover, it is judged whether or not to reproduce the record data, under the control of the CPU 250 (step S212). Here, if the record data is to be reproduced (the step S212: Yes), the record data is reproduced by a predetermined amount on the basis of the set signal processing conditions, under the control of the CPU 250 (step S213).

Then, under the control of the CPU 250, it is judged whether or not the information recording medium is to be ejected (step S214). Here, if the information recording medium is to be ejected (the step S214: Yes), or as a result of the judgment in the step S209 described above, if the finalize process is not performed on the information recording medium (the step S209: No), or as a result of the judgment in the step S212 described above, if the record data is not to be reproduced (the step S212: No), an ejection operation is performed under the control of the CPU 250 (step S215).

On the other hand, as a result of the judgment in the step S214 described above, if the information recording medium is not to be ejected (the step S214: No), as described above, it is judged whether or not to be the optical disc on which the wobbles "WBL" (i.e. the predetermined clock information) described above are pre-formatted, on the basis of the management information, such as version information about the optical disc, on the basis of the management information, under the control of the CPU 250 (step S204).

(3) Optical Disc in Another Embodiment

Next, with reference to FIG. 12 to FIG. 16, an explanation will be given on the detailed structure of an optical disc in another embodiment of the information recording medium of the present invention. Incidentally, in the another embodiment of the information recording medium of the present invention, the same structure as that in the aforementioned embodiment carries the same numerical reference and name, and the explanation thereof will be omitted, as occasion demands.

(3-1) Optical Disc in Another Embodiment—part 1—

Firstly, with reference to FIG. 12 and FIG. 13, another embodiment (part1) of the information recording medium of the present invention will be explained. FIG. 12 is a graph schematically showing the frequency of the predetermined clock information included in the first frequency band in another embodiment (part 1) of the information recording medium of the present invention. FIG. 13 are a schematic diagram (FIG. 13(*a*)) schematically showing the predetermined clock information and the predetermined address information in the optical disc in the another embodiment (part 1) of the information recording medium of the present invention, and a schematic diagram (FIG. 13(*b*)) schematically showing the clock information and the first address information based on the first reference frequency in the optical disc in the comparison example.

As shown in FIG. 12 and FIG. 13(*a*), in the recording area of the optical disc in another embodiment (part 1), the wobbles "WBL" defined by a frequency that is an integral multiple of the first reference frequency, i.e. a tenfold frequency (i.e. another specific example of the "predetermined clock information" of the present invention) are pre-formatted.

Specifically, in the optical disc in another embodiment (part 1), as shown in FIG. 12 and FIG. 13(*a*), 80 pieces of wobbles (or 80 wobbles) "WBL" are formed in one sync frame. In other words, one Even sync frame is constituted by WBL "1" to WBL "80", and one Odd sync frame is constituted by WBL "81" to WBL "160".

In addition, there are only three land pre-pits (i.e. one specific example of the "predetermined address information" of the present invention) (hereinafter referred to as "LPP" as occasion demands) formed in each one sync frame, i.e. substantially in each 80 pieces of wobbles. The three LPPs are formed in the 30 pieces of wobbles from the first wobble. In other words, the three LPPs are formed by a unit of a group of ten wobbles, at the first wobbles of the units, respectively. That is, a cycle "Tstd" in which the LPPs are formed shown in FIG. 13(a) is equal to a cycle "Tstd" in which the address information "LPPstd" is formed shown in FIG. 13(b).

As a result, the frequency of the wobbles "WBL" (i.e. one example of the predetermined clock information) is 10 times, i.e., an integral multiple of the first reference frequency (Fstd: reference frequency for DVD-R/RW). Thus, it is possible to pre-format the predetermined address information "LPP", (i) which cannot be detected by the conventional reproducing apparatus that can detect the address information "LPPstd" (i.e. one specific example of the "first address information" of the present invention), such as LPP (Land Pre-Pit), pre-formatted with the first reference frequency and (ii) which can hold a simple and proper phase relationship with the predetermined clock information.

(3-2) Optical Disc in Another Embodiment—part2—

Next, with reference to FIG. 14, an explanation will be given on another embodiment (part2) of the information recording medium of the present invention. FIG. 14 is a graph schematically showing the frequency of the predetermined clock information included in a second frequency band in another embodiment (part 2) of the information recording medium of the present invention.

As shown in FIG. 14, the frequency "Fwb1" of the wobbles "WBL" (one example of the predetermined clock information) described above may be further included in the second frequency band that can be defined by a second reference frequency "Fstd2". Here, the "second frequency band" in another embodiment means a frequency band that is not detected as the second reference frequency by the conventional reproducing apparatus for judging whether or not the frequency of the clock information can be detected (or identified) as the second reference frequency "Fstd2", on the basis of the self-correlation. Incidentally, the wobble corresponding to the first reference frequency, is referred to as the wobble "WBLstd", and the wobble corresponding to the second reference frequency, is referred to as wobble "WBLstd2". That is, the following equation (2) can indicate the second frequency band.

$$\{(2m) \times Fstd2 - \beta\} < (\text{second frequency band}) < \{(2m) \times Fstd + \beta\} \quad (2)$$

wherein, "m" is an integer number, and β is a predetermined bandwidth that cannot be detected on the basis of the resolution of the signal processing.

Specifically, the frequency band included in the first frequency band and the second frequency band, is a frequency band (i) in which the counter value corresponds to a smaller counter value than a predetermined threshold value in a characteristic curve indicating the self-correlation based on the first reference frequency, and (ii) in which the counter value corresponds to a smaller counter value than a predetermined threshold value in a characteristic curve indicating the self-correlation based on the second reference frequency, as shown in a right-shaded hatched area in FIG. 14.

As described above, the frequency of the wobbles "WBL" (one example of the predetermined clock information) described above, i.e. the frequency "Fwb1" that is an integral multiple, such as twice, 10 times, 12 times, or 14 times, of the first reference frequency (Fstd: frequency for DVD-R/RW), is included in the first frequency band which is a frequency band that is not detected as the first reference frequency by one kind of conventional reproducing apparatus. At the same time, it is included in the second frequency band which is a frequency band that is not detected as the second reference frequency by another kind of conventional reproducing apparatus.

As a result, both (i) one kind of conventional reproducing apparatus that can detect the clock information of the first reference frequency (e.g. a reproducing apparatus for DVD-R/RW) and (ii) another kind of conventional reproducing apparatus that can detect the clock information of the second reference frequency (e.g. a reproducing apparatus for DVD+R/RW) cannot detect the wobbles "WBL" (one example of the predetermined clock information), so that it is possible to perform the reproduction process on the information recording medium of the present invention, as in the general read-only information recording medium.

(3-3) Optical Disc in Another Embodiment—part3—

Next, with reference to FIG. 15, an explanation will be given on another embodiment (part3) of the information recording medium of the present invention. FIG. 15 are a logical block diagram (FIG. 15(a)) schematically showing a judgment procedure in a conventional reproducing apparatus for judging, on the basis of band pass filtering, in judging whether or not the frequency of the clock information can be detected (or identified) as the first reference frequency (Fstd), in another embodiment (part 3) of the information recording medium of the present invention, and a graph (FIG. 15(b)) schematically showing a spectrum obtained on the basis of the band pass filtering.

As shown in FIG. 15(a), on the information recording/reproducing apparatus in the embodiment, it may be judged whether or not the frequency of the clock information can be detected (or identified) as the first reference frequency (Fstd), using an output value outputted by a detection circuit (or a detection wave circuit) for detecting a signal of the push-pull signal, which passes through a band bass filter "BPF" in which a center frequency is "Fwb1" and a bandwidth is "a". Specifically, as shown in FIG. 15(b), if a spectrum that is larger than a noise and larger than a predetermined threshold value, is detected at the frequency "Fwb1", it may be judged that the frequency of the clock information pre-formatted on the optical disc is the first reference frequency.

As a result, according to the recording-type information recording medium, the information recording apparatus, and the information reproducing apparatus in the embodiment described above, it is possible to supply the contents whose copyright is protected by the encryption system, such as a CSS, to a general user, using the information recording medium on which the wobbles "WBL" (one example of the predetermined clock information) described above are pre-formatted. And it is possible to enable the conventional reproducing apparatus to perform the reproduction process on the supplied contents, appropriately and easily. Therefore, according to the optical disc in the embodiment, it is possible to realize both the copyright protection of contents and the retention of reproduction compatibility.

Moreover, as shown in FIG. 16, a content holder that owns copyright, can supply the contents whose copyright is protected, using the recording-type information recording medium (e.g., optical disc) of the embodiments described above. That allows more efficient business, such as sales without stock by small-lot production and small distribution responding to a user's order. Therefore, it is possible to receive such an apparent benefit that efficiency in business can be realized with respect to various resources in human, economy, and equipment, such as a stock management.

In the aforementioned embodiments, as one specific example of the information recording medium, an explanation is given on the single-layer type optical disc on which recording or reproduction can be performed using laser light, such as Blu-ray, red LD light, or infrared rays. In addition, the present invention can be also applied to a multilayer type (or multiple layer type) optical disc with two or more recording layers. Moreover, it can be also applied to other various information recording media which support high-density recording or high transmission rate.

Moreover, in the aforementioned embodiments, as one specific example of the information recording apparatus and the information reproducing apparatus, an explanation is given on the information recording/reproducing apparatus compatible with the single-layer type optical disc. In addition, the present invention can be also applied to an information recording/reproducing apparatus compatible with the multilayer type (or multiple layer type) optical disc with two or more recording layers. Moreover, it can be also applied to an information recording/reproducing apparatus compatible with other various information recording media which support high-density recording or high transmission rate.

The present invention is not limited to the aforementioned embodiments, but various changes may be made, if desired, without departing from the essence or spirit of the invention which can be read from the claims and the entire specification. An information recording medium, an information recording apparatus and method, an information reproducing apparatus and method, and a computer program for recording control, all of which involve such changes, are also intended to be within the technical scope of the present invention.

INDUSTRIAL APPLICABILITY

The information recording medium, the information recording apparatus and method, the information reproducing apparatus and method, and the computer program according to the present invention can be applied to an information recording medium, such as an optical disc, on which recording and reproduction can be performed by irradiating it with laser light, such as a DVD (Digital Versatile Disc), a BD (Blu-ray Disc), and a CD (Compact Disc), and also applied to an information recording/reproducing apparatus or the like for the information recording medium. Moreover, they can be applied to an information recording/reproducing apparatus or the like which is mounted on various computer equipment for consumer use or for commercial use, or which can be connected to various computer equipment.

The invention claimed is:

1. An information recording medium for being able to record data by additional writing or re-writing, said information recording medium comprising:

a groove track wholly wobbling at a frequency that is an even multiple of 140 kHz at the normal scanning velocity that is defined by the DVD-R standard or the DVD-RW standard, in order that 140 kHz at the normal scanning velocity is not detected by a reproduce apparatus, that uses a wobble detection method based on a self-correlation and comprising (i) a delay step of delaying a wobble signal for a half-period corresponding to 140 kHz at the normal scanning velocity; and (ii) an exclusive OR step of XORing the wobble signal and the delayed wobble signal; and control data zone included in the groove track for recording key information for encrypting the record data on the basis of the CSS (Content Scrambling System) encryption method.

2. The information recording medium according to claim 1, wherein the groove track wholly wobbles at a frequency that is 2 times, 10 times, 12 times or 14 times of 140 kHz at the normal scanning velocity that is defined by the DVD-R standard or the DVD-RW standard.

* * * * *